(12) United States Patent
Kato et al.

(10) Patent No.: US 6,188,700 B1
(45) Date of Patent: Feb. 13, 2001

(54) METHOD AND APPARATUS FOR ENCODING MPEG SIGNALS USING VARIABLE RATE ENCODING AND DYNAMICALLY VARYING TRANSMISSION BUFFERS

(75) Inventors: Motoki Kato; Hideki Koyanagi, both of Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 08/958,569

(22) Filed: Oct. 28, 1997

(30) Foreign Application Priority Data

Nov. 7, 1996 (JP) .................................................. 8-295477

(51) Int. Cl.[7] .............................. H04J 3/18; H04J 3/16; H04J 3/22
(52) U.S. Cl. ...................... 370/477; 370/468; 375/240.02
(58) Field of Search ..................................... 370/465, 412, 370/468, 477, 522; 348/404, 407, 419, 845.3; 375/240.01, 240.02, 240.04, 240.23

(56) References Cited

U.S. PATENT DOCUMENTS

| | | | |
|---|---|---|---|
| 5,543,853 | * 8/1996 | Haskell et al. | 348/497 |
| 5,565,924 | * 10/1996 | Haskell et al. | 348/423 |
| 5,619,341 | * 4/1997 | Auyeung et al. | 358/404 |
| 5,677,969 | * 10/1997 | Auyeung et al. | 382/239 |
| 5,774,455 | * 6/1998 | Kawase et al. | 370/232 |
| 5,793,436 | * 8/1998 | Kim | 348/497 |

\* cited by examiner

*Primary Examiner*—David R. Vincent
(74) *Attorney, Agent, or Firm*—Limbach & Limbach, L.L.P.

(57) ABSTRACT

An encoded signal signal transmission method and apparatus is disclosed which performs stable signal reproduction without causing any breakage of a buffer on the side of a decoder system even when the transmission bit rate is changed. In encoding and transmitting a digital signal at a variable bit rate, an encoder buffer for temporarily storing an encoded signal on the side of an encoder system has a code buffer used by the encoder system for rate control, with the size of the code buffer being constant, and after a predetermined delay time from when the encoding bit rate is altered, an output bit rate from the encoder buffer is altered to a new value of the encoding bit rate.

6 Claims, 13 Drawing Sheets

METHOD AND APPARATUS FOR ENCODING MPEG SIGNALS USING VARIABLE RATE ENCODING AND DYNAMICALLY VARYING TRANSMISSION BUFFERS

BACKGROUND OF THE INVENTION

1. Field of the Invention

This invention relates to an encoded signal transmission method and apparatus suitable for encoding a digital signal at a variable bit rate on a transmission side and transmitting the encoded signal at the variable bit rate to a receiving side.

2. Description of the Related Art

In order to realize transmission of moving picture signals with high quality as the next-generation television broadcasting, a project of digitizing moving picture signals has been under way. In this case, since directly digitizing moving picture signals generates a huge amount of data, encoding of data (i.e., information compression) is required for efficient transmission of the data on a limited transmission line.

Meanwhile, in general, moving pictures are not stationary and the pattern and movement on a screen vary temporally. In some cases, the pattern and movement greatly differ between the center and peripheral portions of a picture within the screen. Therefore, the amount of generated information in encoding by an encoder varies, depending on such nature of the picture. To send such information at a constant transmission bit rate, a transmission buffer is prepared at the final stage of an encoder system. That is, an encoded output with the varying amount of generated information is temporarily stored in the transmission buffer and is read out and outputted to a transmission line at a predetermined transmission bit rate.

FIG. 1 is a block circuit diagram showing a conventional encoder with a constant output bit rate (hereinafter referred to as encoder system). In this encoder system shown in FIG. 1, a transmission buffer (hereinafter referred to as encoder buffer) 13 is provided between a video encoder 12 supplied with a video input via a terminal 11, and a transmission line. Thus, control is performed so as to smooth fluctuations in the amount of generated bits in a short period of time from the video encoder 12 and to output a bit stream from the encoder buffer 13 at a constant bit rate.

Information including the amount of generated bits S21 of the encoded picture from the video encoder 12, a bit rate R from a terminal 16 and a decoder buffer size B from a terminal 10 is inputted to a rate controller 15. On the basis of a video buffering verifier (VBV) model as later described, the rate controller 15 calculates the amount of allocated bits S22 of a picture to be encoded next, without causing overflow or underflow of a decoder buffer of the size B provided on the side of a decoder system. The rate controller 15 then sends and designates the information of the amount of allocated bits S22 to the video encoder 12.

The encoder buffer 13 supplied with the video bit stream from the video encoder 12 has a code buffer of a size equal to at least the decoder buffer size B. The code buffer is generally included in the transmission buffer.

The bit stream outputted from the encoder buffer 13 is inputted to a multiplexer 14. Although not shown, an encoded bit stream of an audio signal is also inputted to the multiplexer 14. The multiplexer 14 performs system encoding and multiplexing of a plurality of input bit streams, and outputs multiplexed streams from a terminal 17.

The start of output of the bit stream from the encoder buffer is indicated by a start controller 19. In the configuration shown in FIG. 1, a switch 20 provided on the output side of the encoder buffer 13 is controlled by the start controller 19. The start time is calculated from information including the bit rate R and the bit occupancy quantity b0 at the start of decoding of the decoder buffer from a terminal 18, as later described.

FIG. 2 is a block diagram showing a conventional decoder (hereinafter referred to as decoder system). A multiplexed stream from a terminal 25 is inputted to a demultiplexer 26, and the video bit stream split by the demultiplexer 26 is stored in a receiving buffer (hereinafter referred to as decoder buffer) 27. The decoder buffer 27 is adapted for absorbing fluctuations in the amount of bits read out in a short period of time by a video decoder 28. The decoder system is passive to the bit stream transmitted thereto. Therefore, in order to enable the video decoder 28 to perform stable video reproduction, the encoder system must encode data carefully enough to prevent overflow or underflow of the decoder buffer 27.

As a moving picture encoding method, the Moving Picture Experts Group (MPEG) standards have been known. The MPEG is an abbreviation of the group for examining moving picture coding for storage, of the International Organization for Standardization/International Electrotechnical Commission, Joint Technical Committee 1/Sub Committee 29 (ISO/IEC JTC1/SC29). The standards include ISO11172 as the MPEG1 standard and ISO13818 as the MPEG2 standard. In these international standards, ISO11172-1 and ISO13818-1 are provided as standards for multimedia multiplexing, ISO11172-2 and ISO13818-2 as video standards, and ISO11172-3 and ISO13818-3 as audio standards.

The MPEG standards prescribe an ideal input/output model of the decoder buffer 27 of the decoder system, and prescribes that on the assumption of the model of the decoder buffer (i.e., the ideal model of the decoder buffer), the encoder system should encode data carefully enough to prevent overflow or underflow of the decoder buffer 27. The input/output model of the decoder buffer 27 of the decoder system is described in the ISO/IEC 11172-2 Annex C or ISO/IEC 13818-2 Annex C, as a video buffering verifier (VBV) model. A buffer of the VBV model is referred to as a VBV buffer.

The VBV buffer size of the decoder system is indicated by an identifier "vbv_buffer_size" in the MPEG bit stream. The standard size is 1.75 Mbits, for example, in a main profile at main level (MP@ML).

The VBV of the decoder system is assumed to operate under the following ideal conditions.

(1) The bit stream for each picture is outputted instantaneously from the decoder buffer, and each picture is decoded instantaneously.

Under these conditions, when the bit stream is transmitted from the encoder system to the decoder system on the real-time basis, the transmission buffer (encoder buffer) of the encoder system must operate under the following ideal conditions.

(2) Each picture is encoded instantaneously, and the bit stream for each picture is inputted instantaneously to the encoder buffer.

The VBV model in the case where the encoder system and the decoder system operate on the real-time basis via a transmission line as in broadcast or communication will now be described. In the encoder system, as shown in FIG. 1, the bit stream is outputted from the encoder buffer 13 at a constant bit rate. Therefore, the bit stream is inputted to the decoder buffer 27 shown in FIG. 2 at a constant bit rate.

FIG. 3 shows an example of changes in the bit occupancy quantity of the buffers of the encoder system and the decoder system in conformity with the VBV model. In FIG. 3, the area on the right side of a line c-d shows changes in the bit occupancy quantity of the decoder buffer, and the area on the left side of the line c-d shows changes in the bit occupancy quantity of the encoder buffer.

The horizontal axis t expresses the lapse of time. In this case, two time bases are drawn, with an upper time base expressing the lapse of time on the side of the encoder system and a lower time base expressing the lapse of time on the side of the decoder system. In FIG. 3, the line c-d is shared by the encoder system and the decoder system for simplification, and there is no time difference between the encoder system and the decoder system. Actually, however, a constant transmission line delay time D0 exists between the encoder system and the decoder system. Therefore, the time of a point c is the origin t=0 on the time base of the encoder system while it is t=D0 on the time base of the decoder system. The time D0 includes the processing time of the multiplexer 14 of the encoder system, the transmission time, and the processing time of the demultiplexer 26 of the decoder system.

The vertical axis expresses the cumulative value of the amount of bits of the bit stream outputted from the encoder buffer up to a certain time point on the side of the encoder system, and the cumulative value of the amount of bits of the bit stream inputted to the decoder buffer up to a certain time point on the side of the decoder system.

The slope ($\Delta d/\Delta t$) of the line c-d expresses the constant output bit rate R from the encoder buffer 13, when viewed from the side of the encoder system, and the constant input bit rate R to the decoder buffer 27, when viewed from the side of the decoder system.

The width between the line c-d and a line e-f in the direction of vertical axis expresses the size B of the decoder buffer, with B being constant. The width between the line c-d and a line a-b in the direction of vertical axis expresses the size B of the encoder buffer, with B being constant. The buffer sizes in the encoder system and the decoder system are constantly equal to each other.

A(n) expresses an n-th encoded picture and its size expresses the amount of bits of the encoded picture. Each picture is encoded as any one of I-picture, P-picture and B-picture, as shown in FIG. 4. An I-picture is encoded by intra-coding, that is, by using picture signals of itself alone. A P-picture is motion-compensated from an I-picture or a P-picture immediately before, and a prediction residue thereof is encoded. A B-picture is motion-compensated from I-pictures or P-pictures before and after the B-picture, and a prediction residue thereof is encoded. The amount of bits of each encoded picture (An) varies depending on the picture type of I, P or B and the picture pattern.

ETS(n) expresses the time point at which the n-th encoded picture A(n) is encoded. The interval between pictures to be encoded (i.e., ETS(n+1)–ETS(n)) is 1/29.97 seconds for video signals of the NTSC system, and 1/25 seconds for video signals of the PAL system. DTS(n) expresses the time point at which the n-th encoded picture A(n) is decoded. The interval between pictures to be decoded (i.e., DTS(n+1)–DTS(n)) is equal to the interval between pictures to be encoded.

On the side of the encoder system, the area on the lower side of a zigzag step-like locus in FIG. 3 expresses changes in the bit occupancy quantity of the encoder buffer. That is, the distance in the direction of vertical axis from a point at the time point t on the line c-d to the step-like locus expresses the bit occupancy quantity at the time point t. The movement of the step-like locus in the direction of vertical axis indicates that the bit stream is inputted instantaneously from the video encoder 12 to the encoder buffer 13. The movement of the step-like locus in the direction of horizontal axis indicates that the bit stream input from the video encoder 12 to the encoder buffer 13 is stopped (i.e., encoding is stopped) while the bit stream is outputted from the encoder buffer 13 at the bit rate R.

With respect to the encoder system, changes in the bit occupancy quantity of the encoder buffer are hereinafter explained.

The bit occupancy quantity of the encoder buffer is zero before a time point t=ETS(0). Data of the 0th picture A(0) encoded at the time point t=ETS(0) is instantaneously inputted to the encoder buffer, and thus the bit occupancy quantity of the encoder buffer is instantaneously increased by the amount of bits of the 0th encoded picture A(0). The output of the bit stream from the encoder buffer starts at t=0. This start is indicated by the start controller 19 of the encoder system shown in FIG. 1. The start time do is calculated as follows from the bit rate R and the bit occupancy quantity b0 at the start of decoding of the decoder buffer:

$$ETS(0)+do=0$$

$$do=(B-b0)/R$$

From t=0 to the encoding time point ETS(1) of the first picture A(1) next to the 0th picture A(0), since the bit stream is outputted from the encoder buffer at the bit rate R, the bit occupancy quantity of the encoder buffer decreases with the lapse of time. At the encoding time ETS(1), since the first picture A(1) is encoded and supplied to the encoder buffer, the bit occupancy quantity of the encoder buffer is instantaneously increased by the amount of bits of the first picture A(1). From t=ETS(1) to ETS(2), since the bit stream is outputted from the encoder buffer at the bit rate R, the bit occupancy quantity of the encoder buffer decreases with the lapse of time. Similarly, encoding of pictures is continued at a predetermined interval.

Changes in the bit occupancy quantity of the decoder buffer depend on the above-described changes in the bit occupancy quantity of the encoder buffer. On the side of the decoder system, the area on the upper side of the step-like locus expresses changes in the bit occupancy quantity of the decoder buffer. That is, the distance in the direction of vertical axis from a point at the time point t on the line c-d to the step-like locus expresses the bit occupancy quantity of the decoder buffer at the time point t. The movement of the step-like locus in the direction of vertical axis indicates that the video decoder 28 instantaneously reads out the bit stream from the decoder buffer 27. The movement of the step-like locus in the direction of horizontal axis indicates that read-out of the bit stream from the decoder buffer 27 by the video decoder 28 is stopped (i.e., decoding is stopped) while the bit stream is inputted to the decoder buffer 27 at the bit rate R.

With respect to the decoder system, changes in the bit occupancy quantity of the decoder buffer are hereinafter explained.

Input of the bit stream to the decoder buffer starts at t=D0 at the bit rate R. At a time point DTS(0) after the lapse of the time period di, that is, $$di=b0/R$$

the 0th encoded picture A(0) is decoded.

The time period di or the time point DTS(0) is indicated in the received bit stream. The bit occupancy quantity of the decoder buffer is instantaneously decreased by the amount of bits of the 0th encoded picture A(0) by decoding of the 0th picture A(0) at the time point DTS(0). Subsequently, until the next time point DTS(1), since the bit stream is inputted to the decoder buffer at the bit rate R, the bit occupancy quantity of the decoder buffer increases with the lapse of time. At the time point DTS(1), since the first encoded picture A(1) is decoded, the bit occupancy quantity of the decoder buffer is instantaneously decreased by the amount of bits of the first encoded picture A(1). Similarly, decoding of each picture is continued at a predetermined decoding time interval.

T(i) is a time interval from a time point ETS(i) at which the i-th encoded picture A(i) is encoded to a time point DTS(i) at which the encoded picture A(i) is decoded. That is, $$T(i)=DTS(i)-ETS(i).$$

T is hereinafter referred to as delay time.

In order to perform stable picture reproduction on the side of the decoder system (i.e., receiving side), the delay time T(i) must be constant for encoding/decoding of all the encoded pictures. That is, $$T=T(0)=T(1)=\ldots=T(n).$$

Thus, the locus of the bit occupancy quantity of the decoder buffer is a locus which is caused to proceed to the future (horizontally translated to the right) by the delay time T from the locus of the bit occupancy quantity of the encoder buffer, as shown in FIG. 3.

On the assumption that B represents the buffer size, Oe(n) represents the bit occupancy quantity of the encoder buffer immediately before the n-th encoded picture A(n) is encoded, Ve(n) represents the quantity of free space of the encoder buffer immediately before the n-th encoded picture A(n) is encoded, Od(n) represents the bit occupancy quantity of the decoder buffer immediately before the n-th encoded picture A(n) is decoded, and Vd(n) represents the quantity of free space of the decoder buffer immediately before the n-th encoded picture A(n) is decoded, the following relations are obtained.

Ve(n)=B−Oe(n)

Vd(n)=B−Od(n)

Oe(n)=Vd(n)

Ve(n)=Od(n)

B=Oe(n)+Ve(n)=Od(n)+Vd(n)=Oe(n)+Od(n)

Specifically, the sum of the bit occupancy quantity of the encoder buffer of the encoder system and the bit occupancy quantity of the VBV buffer (decoder buffer) of the decoder system is controlled to be a constant value (a value corresponding to the buffer size B) via the delay time T, as shown in FIG. 5.

The delay time T is calculated by the following equation, $$T = \tau e(n) + \tau d(n) + D0$$
$$= Oe(n)/R + Od(n)/R + D0$$
$$= B/R + D0$$

where D0 represents the amount of transmission line delay (constant).

On the assumption that r represents the time required for changing the bit occupancy quantity of the encoder buffer from the buffer size B to 0 when the output bit rate is R, or the time required for changing the bit occupancy quantity of the decoder buffer from 0 to B when the input bit rate is R, the following relations are obtained.

$\tau=B/R=\tau e(n)+\tau d(n)$ (constant)

$T=\tau+D0$ (constant)

On the assumption of this buffer model, the encoder system must encode and transmit data carefully enough to prevent overflow or underflow of the decoder buffer of the decoder system. If the step-like locus on the side of the decoder system is between the line c-d and the line e-f so as not to exceed the buffer B, the decoder system can stably decode pictures. On the contrary, if the step-like locus is above the line c-d, underflow is generated in the decoder buffer. If the step-like locus is below the line e-f, overflow is generated in the decoder buffer.

When the k-th picture A(k) is to be encoded, the encoder system encodes the picture A(k), assuming the state of the bit occupancy quantity of the decoder buffer at the time when the picture A(k) is decoded. At this point, the amount of generated bits of the k-th picture A(k) must meet the following conditions.

R, B are constant for $t \geq D0$.

When k=0, $$Od(0)=b0 \qquad (1)$$

When $k \geq 1$, $$Od(k) = b0 + (DTS(k) - DTS(0)) \times R - \sum_{i=0}^{k-1} A(i)$$

$$Od(k)+R\times(DTS(k+1)-DTS(k))-B \leq A(k) \leq Od(k) \qquad (3)$$

where A(k)>0

In the encoder system of FIG. 1, the amount of bits of the picture A(i) for i<k corresponds to the amount of generated bits S21 from the video encoder 12. The rate controller 15 indicates the value of the amount of bits (size of the picture A(k)) satisfying the equation (3), as the amount of allocated bits S22 of the k-th picture A(k). By conducting such control, the encoder system encodes data without causing overflow or underflow of the decoder buffer of the decoder system.

In the above-described conventional technique, there is no problem in the case where the data transfer rate between the encoder system and the decoder system is a constant rate. However, when data is transmitted at a variable bit rate, a problem may arise such that the picture cannot be stably reproduced on the side of the decoder system. An example of such problem is described with reference to FIG. 6.

In this case, similar to the above-described conventional technique, the size of the encoder buffer of the encoder system is constant and equal to the size B of the VBV buffer (decoder buffer) of the decoder system.

In the encoder system in the case where data are transmitted at a variable bit rate, for example, the encoding bit rate is altered from R1 to R2 from when the n-th picture A(n) is encoded, and in synchronization with this alteration, the output bit rate R from the encoder buffer is altered from R1 to R2. In FIG. 6, the output bit rate R from the encoder buffer is shown with the slope changed at a time point t=ETS(n), which is a junction point between a line e-f and a line f-g. Specifically, the relation between the output bit rate R and the encoding bit rates R1, R2 is held as follows.

R=R1: 0≦t ETS(n)

R=R2: ETS(n)≧t where R1>R2

In this case, the encoder system assumes that an area where the locus of the bit occupancy quantity of the VBV buffer of the decoder system may possibly pass is between a bent line e-f-p-q and a bent line h-i-r in accordance with the relations of the equations (1), (2) and (3). It is now assumed that the encoder system has encoded data in such a manner that the locus of the bit occupancy quantity of the encoder buffer is between a bent line e-f-g and a bent line a-b-d, as shown in FIG. 6.

In this case, as clear from FIG. 6, the problem of underflow is generated in the decoder buffer when the n-th picture A(n) is decoded.

This is because, in the example of FIG. 6, the time interval from a time point of encoding a picture to a time point of decoding the picture varies between the case where the output bit rate R is equal to the encoding bit rate RI and the case where the output bit rate R is equal to R2. That is, if the time interval for R=R1 is expressed by T1 while the time interval for R=R2 is expressed by T2, the following relations are obtained.

When R=R1, $$T1=Oe(1)/R1+Od(1)/R1+D0=B/R1+D0$$

When R=R2, $$T2=Oe(n)/R2+Od(n)/R2+D0=B/R2+D0$$

Since DO is the transmission line delay time, which is constant, and R1>R2, the relation of T1<T2 is obtained.

As seen from FIG. 6, on the side of the decoder system, with respect to the 0th picture A(0) to the (n−1)th picture A(n−1), the time interval from encoding of the picture to the decoding of the picture is constantly T1 so that the picture may be stably decoded.

However, a problem arises when the picture A(n) is decoded. Specifically, when the picture A(n) is to be decoded, since the picture A(n) does not perfectly reach the decoder buffer at a time point t=(ETS(n)+T1), the problem of underflow occurs. From the locus of X in FIG. 6 in the case where the picture A(n) is to be decoded at the time point t=(ETS(n)+T1), it in understood that underflow is generated in the decoder buffer. The picture A(n) can be correctly decoded at a time point t=DTS(n)=ETS(n)+T2. Therefore, the decoder system cannot perform normal decoding during a period from the time point t=(ETS(n)+T1) to the time point t=DTS(n) as indicated by F in FIG. 6, thus causing a problem in picture display. Specifically, since display of the picture A(n−1) immediately before the last decoding is continued during this period, the problem of freezing (stationary) display occurs.

In view of the above-described problems, it is an object of the present invention to provide an encoded signal transmission method and apparatus for conducting control so as to prevent overflow or underflow of the decoder buffer of the decoder system in the case where digital signals are encoded on the side of the encoder system (i.e., transmission side) at a variable bit rate and are transmitted to the decoder system (i.e., receiving side) at a variable bit rate.

SUMMARY OF THE INVENTION

In order to solve the above-described problem, when a video sequence is encoded at a variable bit rate and transmitted to the receiving side (the decoder system) on the real-time basis, the time interval from encoding of a picture to decoding of the picture must be constant for all pictures.

Thus, in an encoded signal transmission method according to the present invention, in encoding and transmitting a digital signal at a variable bit rate, the size of a transmission buffer for temporarily storing an encoded signal on the side of an encoder system is controlled in accordance with an encoding bit rate.

Therefore, first means alters an output bit rate from the transmission buffer to a new encoding bit rate value after a predetermined delay time from when the encoding bit rate is altered on the assumption that the size of a code buffer which may be used by the encoder system is constant.

As specific means therefor, the delay time is determined from the receiving buffer size of the decoder system and the minimum value of the encoding bit rate. Also, the size of the transmission buffer required for the encoder system is determined from the receiving buffer size of the decoder system and the minimum value and the maximum value of the encoding bit rate.

Specifically, when the receiving buffer size of the decoder is expressed by B and the minimum value of the encoding bit rate is expressed by RMIN, the delay time τ is determined by $$\tau=B/\text{RMIN}.$$

When the maximum value of the encoding bit rate is expressed by RMAX, the buffer size BBMAX required for the transmission buffer is determined by $$\text{BBMAX}=B\times\text{RMAX}/\text{RMIN}.$$

As second means, it is assumed that the minimum value of the encoding bit rate is RMIN and the maximum value thereof is RMAX when the code buffer size used by the encoder for rate control is equal to the size B required for the receiving buffer. In this case, if the encoding bit rate is not smaller than the minimum value RMIN, the code buffer size is of a predetermined constant value. If the encoding bit rate is smaller than the minimum value RMIN, the code buffer size is altered to be smaller than the constant value.

As specific means therefor, on the assumption that the size of the code buffer is Bcur and the current encoding bit rate is Rcur, when the encoding bit rate is smaller than the minimum value RMIN, the code buffer size Bcur is determined as follows in accordance with the receiving buffer size B, the minimum value RMIN and the current encoding bit rate Rcur.

$$\text{Bcur}=\text{Rcur}\times B/\text{RMIN}=\text{Rcur}\times\tau$$

Specifically, when the current encoding bit rate Rcur is changed from a value Rprev not smaller than the minimum value RMIN to a value smaller than the minimum value RMIN, or when the current encoding bit rate Rcur is changed from a value Rprev smaller than the minimum value RMIN to a value not smaller than the minimum value RMIN, the size switching time point for the code buffer of the transmission buffer is a time point preceding the time point when the encoding bit rate is changed, by a time δ determined by $$\delta=(B-\text{Bcur})/(\text{Rprev}-\text{Rcur}).$$

After at least a delay time of (τ−δ) from when the encoding bit rate Rcur is altered to the current value, the output bit rate from the transmission buffer is altered to the encoding bit rate Rcur.

In the case where the decoder system on the receiving side is in conformity with the ISO/IEC 11172-2 or ISO/IEC 13818-2 (MPEG1 or MPEG2) standard, it is considered on the side of the encoder system that the receiving buffer of the decoder system is a VBV buffer in the video buffering verifier (VBV) defined by the ISO/IEC 11172-2 Annex C or ISO/IEC 13818-2 Annex C. In this case, when a certain picture is to be encoded, the code buffer size usable for rate control is equal to the VBV buffer size required for decoding that picture, and the output bit rate of a certain picture from the encoder buffer is equal to the input bit rate of that picture to the VBV buffer.

By using the VBV buffer size of the decoder system and the input bit rate to the VBV buffer thus calculated, calculation of the amount of allocated bits and control of the amount of generated bits at the time of encoding the input picture are carried out. Thus, stable picture reproduction is enabled without causing overflow or underflow on the side of the decoder system (receiving side).

DETAILED DESCRIPTION OF THE INVENTION

Preferred embodiments of the encoded signal transmission apparatus for realizing the encoded signal transmission method according to the present invention will now be described with reference to the drawings. In the following embodiments, encoding and transmission of video signals are described. However, application of the present invention is not limited to video signals and the present invention may also be applied to audio signals.

Figure 7:
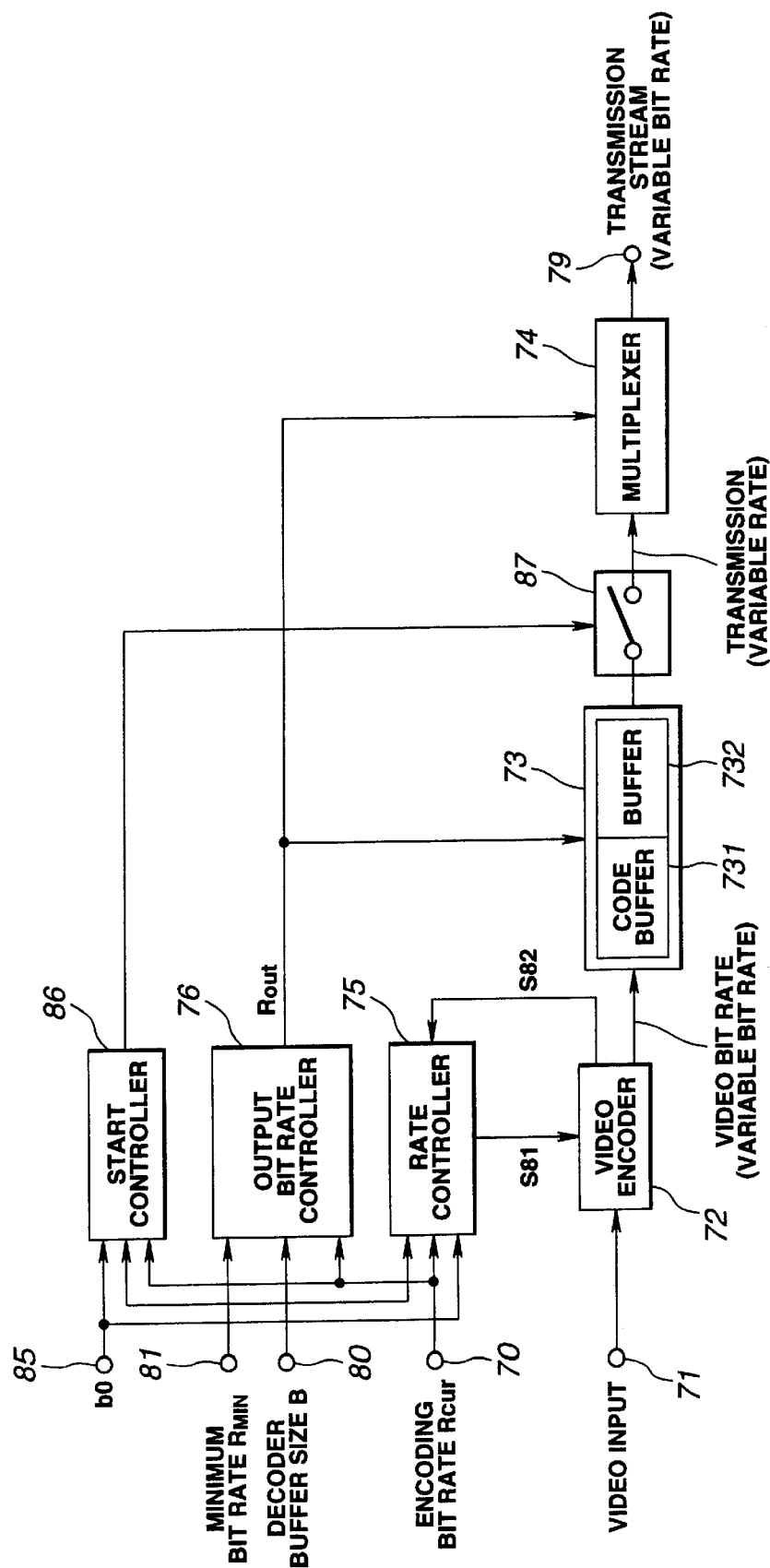
FIG. 7 is a block circuit diagram showing an encoder system of a first embodiment according to the present invention.

FIG. 7 shows an exemplary structure of an encode system to which a first embodiment of the encoded signal transmission method according to the present invention is applied.

In the encoder of FIG. 7 (hereinafter referred to as encoder system), an input video sequence is encoded at a variable bit rate and then outputted at a variable bit rate from a transmission buffer (hereinafter referred to as encoder buffer) 73. In order to control this operation, this encoder system differs from the encoder system of FIG. 1 as described as the conventional technique, with respect to the function of an output bit rate controller 76 and the size required for the encoder buffer 73.

Figure 1:
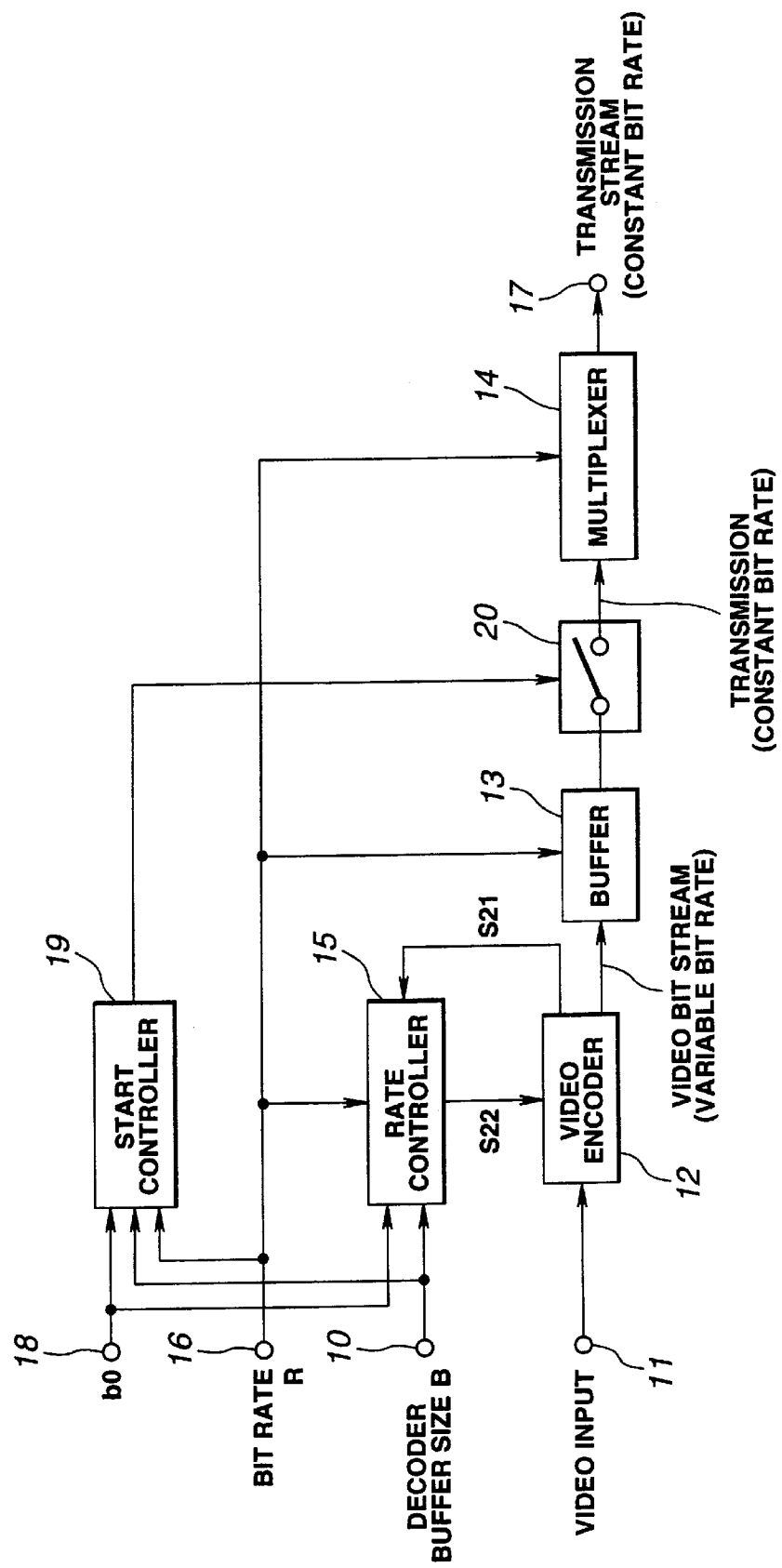
FIG. 1 is a block circuit diagram showing a conventional encoder system in the case where the output bit rate is constant.

In the encoder system of FIG. 1 as described as the conventional technique, the bit rate R indicated from the terminal 16 directly becomes the output bit rate R from the encoder buffer 13. Also, in FIG. 1, it suffices to have the size B of the encoder buffer 13 equal to the size of the decoder buffer 27.

On the contrary, in the encoder system of the first embodiment shown in FIG. 7, the output bit rate controller 76 controls an output bit rate Rout from the encoder buffer 73. In addition, the size of the encoder buffer 73 must be greater than the VBV buffer size of the decoder system.

Specifically, in the first embodiment shown in FIG. 7, the encoder buffer 73 has a code buffer 731 used by the encoder system for rate control. On the assumption that the size of this code buffer 731 is constant, after a predetermined delay time from when an encoding bit rate is altered, an output bit rate from the encoder buffer 73 is altered to a new encoding bit rate value.

The delay time is determined from the receiving buffer size (decoder buffer size) of the decoder system and the minimum value of the encoding bit rate. The size of the encoder buffer 73 is determined from the decoder buffer size of the decoder system and the minimum value and the maximum value of the encoding bit rate. Specifically, the delay time $\tau$ is determined by $$\tau = B/\text{RMIN}$$

where B represents the decoder buffer size of the decoder system and RMIN represents the minimum value of the encoding bit rate. The buffer size BBMAX required for the encoder buffer 73 is determined by $$\text{BBMAX} = B \times \text{RMAX}/\text{RMIN}$$

where B represents the decoder buffer size of the decoder system, RMIN represents the minimum value of the encoding bit rate, and RMAX represents the maximum value of the encoding bit rate.

Referring to FIG. 7, in the encoder system of FIG. 7, a video signal is inputted from a terminal 71, and a target value Rcur of the encoding bit rate for the current input video may be freely designated by a user from a terminal 70. The encoding bit rate is changeable.

A video encoder 72 encodes the current input picture so as to be close to the amount of allocated bits S81 designated from a rate controller 75, and supplies the bit stream of the resulting encoded picture to the encoder buffer 73.

The bit occupancy quantity bO at the start of decoding of the decoder buffer, the amount of generated bits S82 of the encoded picture, the encoding bit rate Rcur, and the VBV buffer size B of the decoder system are inputted to the rate controller 75. The rate controller 75 then calculates the amount of allocated bits S81 of a picture to be encoded next by a method as later described, without causing overflow or underflow of the VBV buffer of the size B, and designates the amount of allocated bits S81 to the video encoder 72.

A start controller 86, similar to the start controller of FIG. 1 described as the conventional technique, is adapted for indicating the output start of the bit stream from the encoder buffer. That is, the start of output of the bit stream from the encoder buffer 73 is indicated by the start controller 86. In FIG. 7, a switch 87 provided on the output side of the encoder buffer 73 is controlled by the start controller 86. The start time is calculated from information including the encoding bit rate Rcur and the bit occupancy quantity b0 at the start of decoding of the decoder buffer from a terminal 85, as later described.

The bit stream outputted from the encoder buffer 73 at the output bit rate Rout is inputted to a multiplexer 74. Although not shown, an encoded bit stream of audio signals is also inputted to the multiplexer 74. The multiplexer 74 performs system encoding and multiplexing of a plurality of input bit streams, and outputs multiplexed bit streams from a terminal 79.

The output bit rate controller 76, the encoder buffer 73, and the rate controller 75 are hereinafter described in detail.

Figure 2:
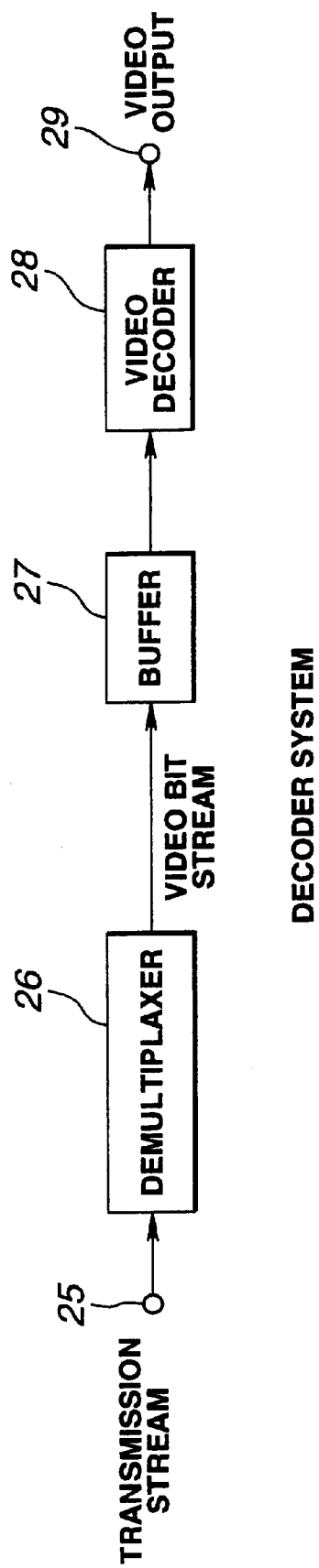
FIG. 2 is a view showing a conventional decoder system.
Figure 8:
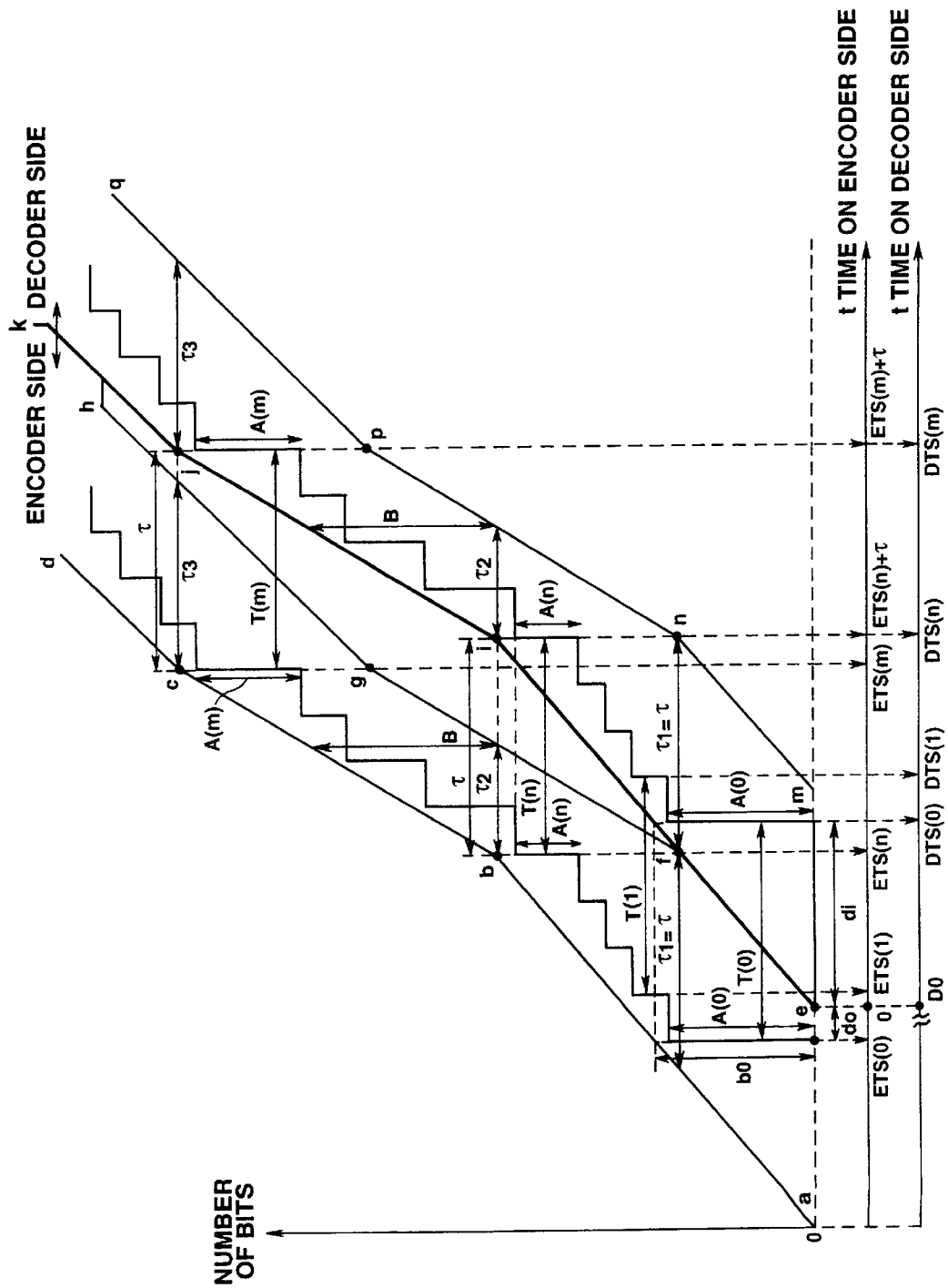
FIG. 8 illustrates changes in the bit occupancy quantity of buffers of the encoder system and the decoder system of the first embodiment.

FIG. 8 shows changes in the bit occupancy quantity of the buffers of the encoder system and the decoder system in the present embodiment. The decoder system in this case is the same as the decoder system of FIG. 2 described as the conventional technique.

In FIG. 8, the area on the left side of a bent line e-f-i-j-k expresses changes in the bit occupancy quantity of the encoder buffer 73 of the encoder system, and the area on the right side of the line expresses changes in the bit occupancy quantity of the decoder buffer 27 of the decoder system.

The slope of the line e-f-i-j-k at a time point t expresses the output bit rate Rout from the encoder buffer 73 at the time point t, when viewed from the side of the encoder system, and expresses a change in the input bit rate to the decoder buffer 27 at the time point t, when viewed from the side of the decoder system.

Although the encoder buffer 73 is not sectioned, it is assumed as a matter of convenience that the encoder buffer is divided into the code buffer 731 and a buffer 732, as shown in FIG. 7. The size of the code buffer 731 is equal to the size B of the decoder buffer 27.

The slope of a bent line e-f-g-h at a time point t apparently expresses a bit rate RV of output from the code buffer 731 at the time point t.

The width in the direction vertical axis between the bent line e-f-i-j-k and a bent line m-n-p-q expresses the upper limit of the VBV buffer size B of the decoder system, with B being constant. The width between the bent line e-f-g-h and a bent a-b-c-d expresses the upper limit of the size B of the code buffer 731 of the encoder system, with B being constant.

Figure 3:
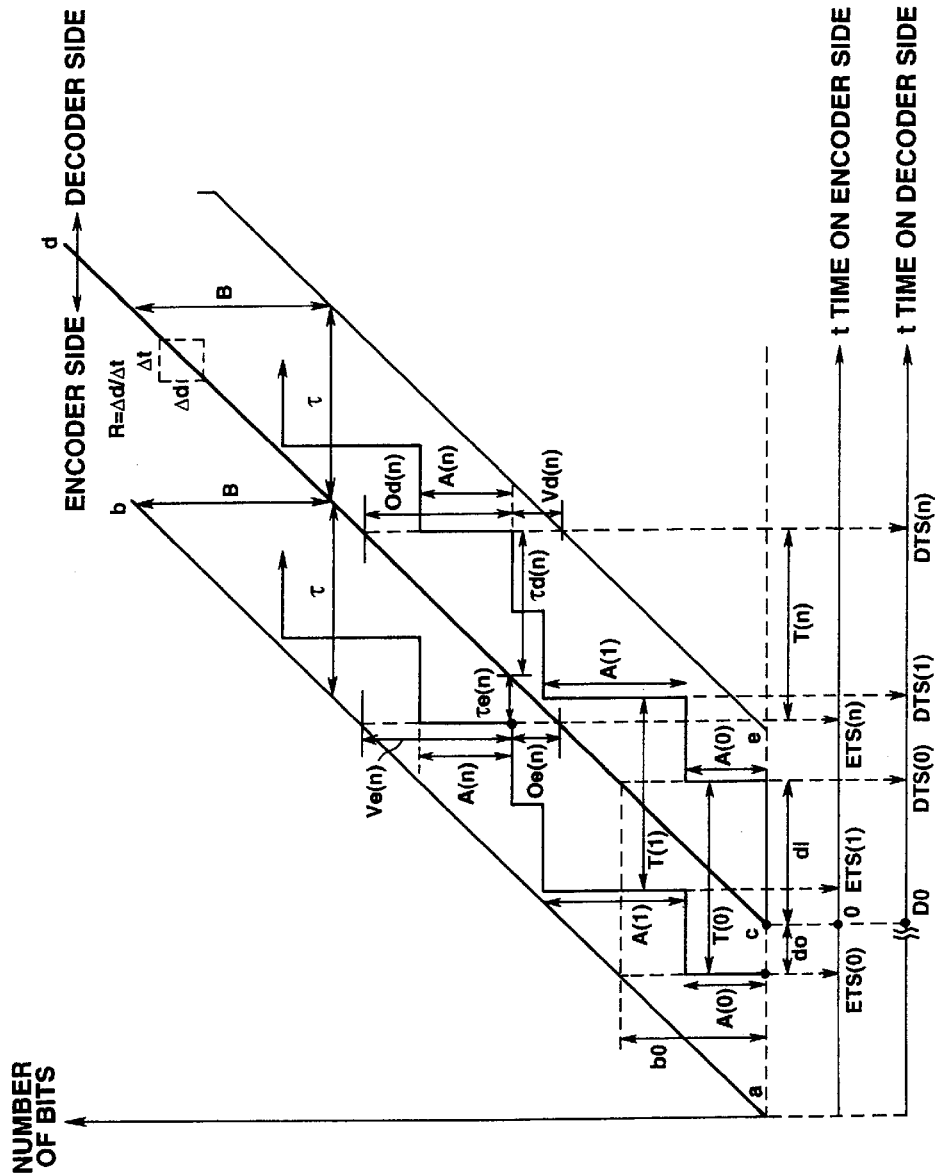
FIG. 3 illustrates changes in the bit occupancy quantity of each buffer of the encoder system and the decoder system in the case where the output bit rate is constant.
Figure 4:
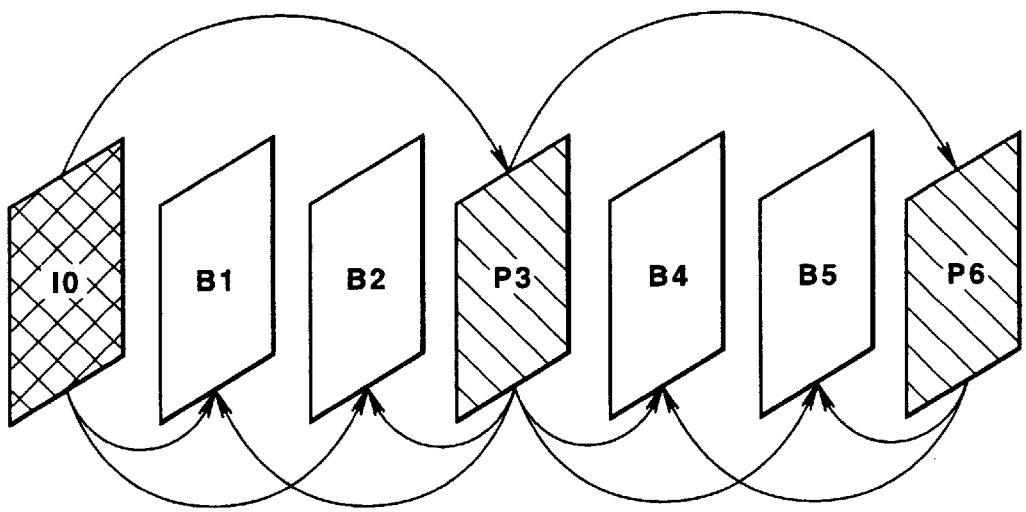
FIG. 4 illustrates types of pictures.
Figure 5:
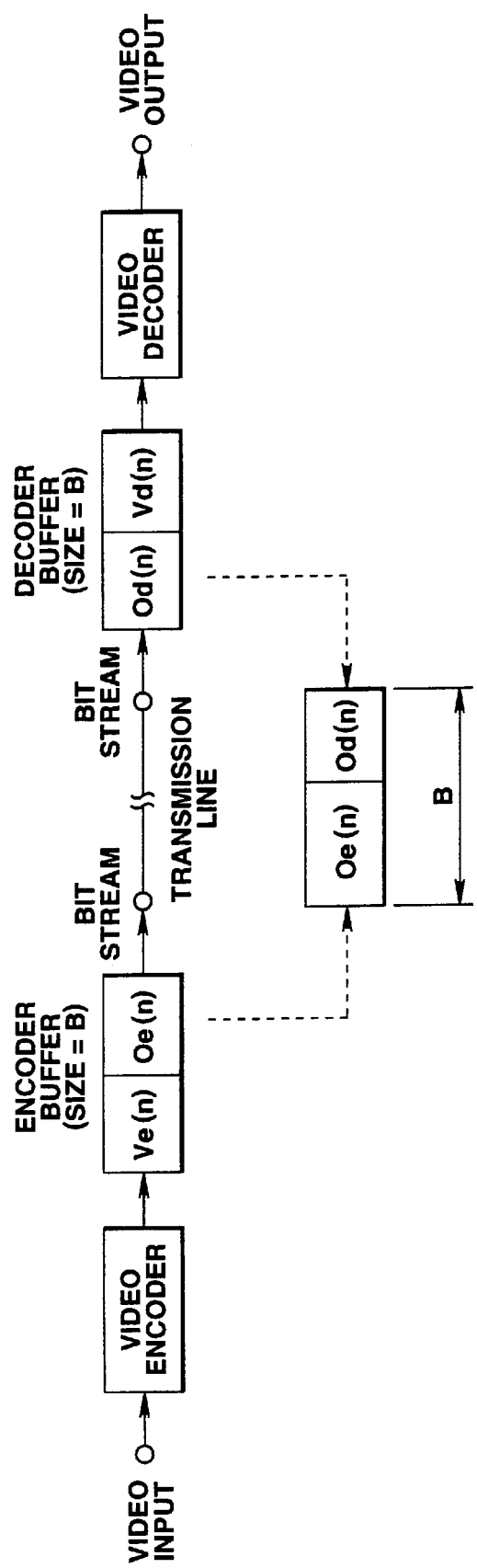
FIG. 5 illustrates the relation of the bit occupancy quantity of the buffers of the encoder system and the decoder system.
Figure 6:
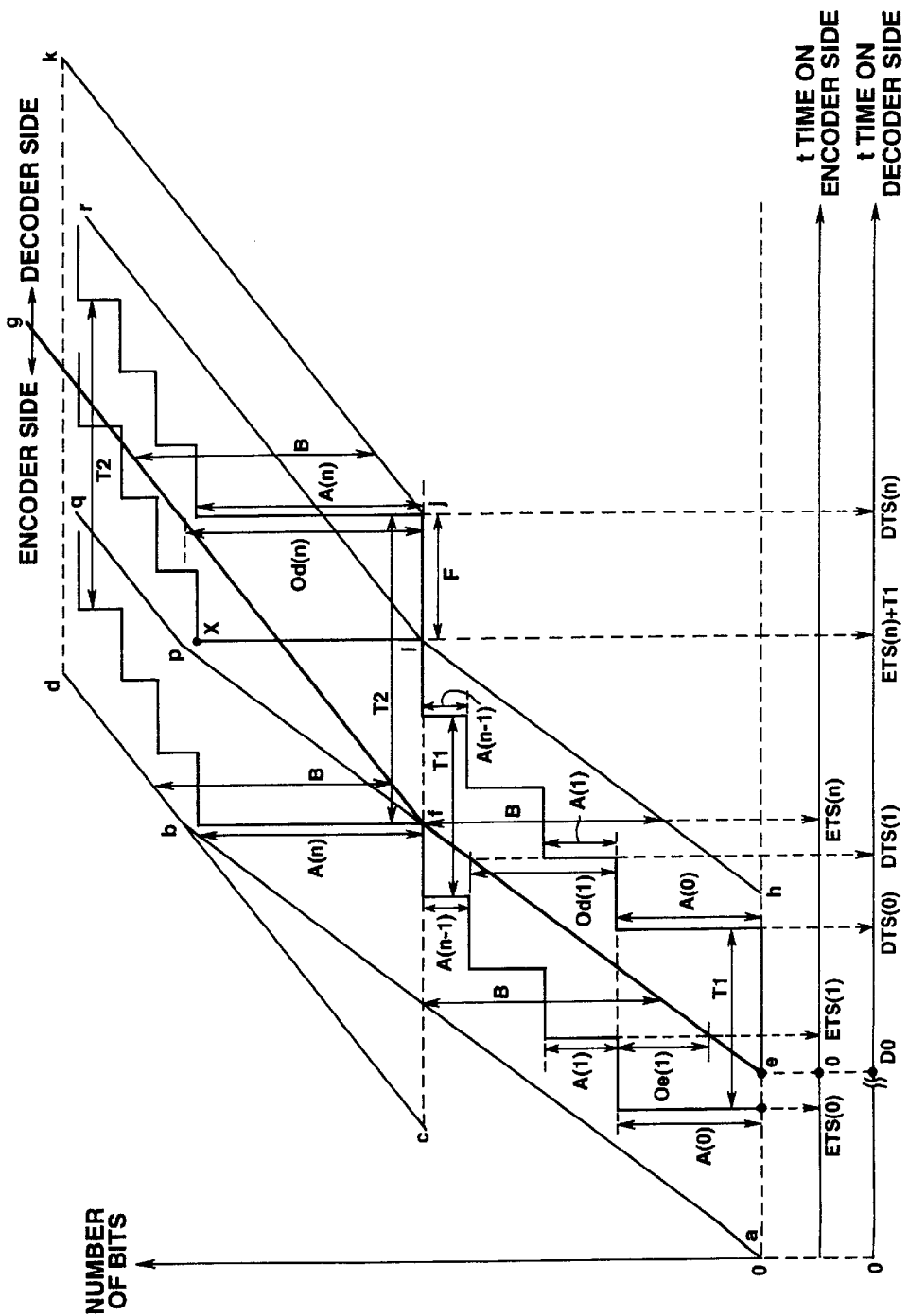
FIG. 6 illustrates a problem occurring in the case where the output bit rate is caused to be variable in nth encoder system of FIG. 1.

The same symbols as those in FIG. 3 have the same meanings, such as, D0, A(n), ETS(n), DTS(n), T(n) and the like. Specifically, D0 represents a constant transmission line delay time existing between the encoder system and the decoder system. A(n) represents the n-th encoded picture, with its size expressing the amount of bits of the n-th encoded picture A(n). ETS(n) represents the time point at which the n-th encoded picture A(n) is encoded. DTS(n) represents the time point at which the n-th encoded picture A(n) is decoded. T(n) represents the time interval from the time point ETS(n) at which the n-th encoded picture A(n) is encoded to the time point DTS(n) at which the n-th encoded picture A(n) is decoded.

With respect to the input video sequence, the encoding bit rate Rcur is indicated as follows.

Rcur=RX: an encoding bit rate from the 0th picture A(0) to the (n−1)th picture A(n−1) (ETS(0)≦t<ETS(n))

Rcur=RY: an encoding bit rate from the n-th picture A(n) to the (m−1)th picture A(m−1) (ETS(n)≦t<ETS(m))

Rcur=RZ: an encoding bit rate for the m-th picture A(m) and the subsequent pictures (ETS(m)≦t)

These bit rates RX, RY and RZ are indicated from the terminal 70 in response to the input video signal inputted from the terminal 71. In this embodiment, the following relation is maintained.

$$RX<RZ<RY$$

where RX is the minimum bit rate and RY is the maximum bit rate.

T(i) is the time interval from a time point at which an i-th picture A(i) is encoded to a time point DTS(i) at which the i-th picture A(i) is decoded. That is, $$T(i)=DTS(i)-ETS(i).$$

In order to enable stable picture reproduction on the side of the decoder system, the time interval T(i) must be constant for all the pictures (A(i)), that is, $$T=T(0)=T(1)=\ldots T(n) \tag{2-1}$$

Therefore, the locus of the bit occupancy quantity of the decoder buffer must be a locus which is caused to proceed to the future (horizontally translated to the right) by the time T from the locus of the bit occupancy quantity of the encoder buffer 73, as shown in FIG. 8. Determination of the output bit rate Rout for satisfying the condition of the equation (2-1) is hereinafter explained.

Changes in the output bit rate (the slope of the bent line e-f-g-h at the time point t) from the code buffer 731 of the encoder system are synchronized with changes in the encoding bit rate Rcur.

d0=(B−b0)/RX: the delay time to the start of output of the bit stream from the code buffer 731 after ETS(0)

RV=RX: 0≦t ETS(n)

RV=RY: ETS(n)≦t<ETS(m)

RV=RZ: ETS(m)≦t

In this case,

τ1=B/RX

τ2=B/RY

τ3=B/RZ where τ1, τ2 and τ3 represent the times required for changing the bit occupancy quantity of the encoder buffer 73 from B to 0 when the output bit rate RV of the code buffer 731 is RX, RY and RZ, respectively. Since RX<RZ<RY, the following relation is maintained.

$$\tau1>\tau3>\tau2$$

When the size of the code buffer 731 is constant and its output bit rate RV is a variable bit rate, the maximum delay time of the encoder buffer 73 is changed. In this case, the maximum value is Thus, apparently, the buffer 732 is provided on the subsequent stage of the code buffer 731 and the delay time of the buffer 732 is added to the maximum delay time of the code buffer 731 at the time point t, thereby causing the maximum delay time τ of the encoder buffer 73 to be constant with respect to the time t.

$$\tau=\tau1$$

where the maximum delay time τ1 of the code buffer 731 is used as a reference. The delay time of the buffer 732 required in this case is expressed by a shaded portion between a bent line f-g-h and a bent line f-i-j-k. That is, the bent line e-f-i-j-k is a bent line which is horizontally translated to the right by the time τ1 (=τ) from the bent line a-b-c-d. The slope of the bent line e-f-i-j-k at the time point t expresses the bit rate Rout of the output from the encoder buffer 73 at the time point t.

Rout=RX: $0 \leq t < ETS(n)+\tau$

Rout=RY: $ETS(n)+\tau \leq t < ETS(m)+\tau$

Rout=RZ: $ETS(m)+\tau \leq t$

In short, after the time τ from when the encoding bit rate Rcur (or the output bit rate RV from the code buffer 731) is altered, the output bit rate Rout of the encoder buffer 73 is altered. The output bit rate controller 76 of FIG. 7 controls this alteration.

The time τ and the buffer size BBMAX required for the encoder buffer 73 are determined as follows.

$$\tau = B/\text{RMIN} = \text{Bcur}/\text{RMAX}$$

$$\text{BBMAX} = B \times \text{RMAX}/\text{RMIN}$$

where B represents the VBV buffer size of the decoder, RMIN represents the minimum value of the encoding bit rate Rcur, and the RMAX represents the maximum value of the encoding bit rate. In the specific example of FIG. 8, RMIN=RX, and RMAX=RY.

If the above-described conditions are met, the following relation is obtained.

$$T = T(n) = \tau + D0 \text{ (constant)}$$

where D0 represents the transmission line delay amount (constant).

On the assumption of the buffer model as described above, the encoder system must perform encoding carefully enough to prevent overflow or underflow of the decoder buffer. Specifically, the rate controller 75 must be controlled so that the step-like locus on the side of the decoder system is located between the bent line e-f-i-j-k and the bent line m-n-p-q so as not to exceed the decoder buffer size B.

When the k-th picture A(k) is to be encoded, the encoder system encodes the picture A(k), assuming the state of the bit occupancy quantity of the decoder buffer at the time when the picture A(k) is decoded. In this case, the amount of generated bits of the k-th picture (i.e., the size of the picture A(k)) must satisfy the following conditions.

When k=0, $$Od(0) = b0 \tag{2-2}$$

When $k \geq 1$, $$Od(k) = b0 + \sum_{i=0}^{k-1}((DTS(i+1) - DTS(i)) \times R) - \sum_{i=0}^{k-1} A(i)$$

$$Od(k) + R \times (DTS(k+1) - DTS(k)) - B \leq A(k) \leq Od(k) \tag{2-4}$$

where $A(k) \geq 0$

If the problem of underflow of the encoder buffer 73 is not considered, the following equation (2-5) may be employed in place of the equation (2-4).

$$A(k) \leq Od(k) \tag{2-5}$$

where $A(k) \geq 0$, $0 \leq Od(k) < B$

When the equation (2-5) is used, if the output bit rate from the encoder buffer 73 of FIG. 7 does not reach the designated Rout, the multiplexer 74 performs bit stuffing to increase the output bit rate to Rout.

Rout represents the input bit rate to the decoder buffer 27 at the time point t, and B represents the size of the decoder buffer 27, which is constant.

Since the input bit rate (Rout) to the decoder buffer 27 at the time point t is equal to the output bit rate from the encoder buffer 73 at a time point which is preceding by the time D0, the following relations are obtained.

Rout=RX: $D0 \leq t < ETS(n)+D0+\tau$

Rout=RY: $ETS(n)+D0+\tau \leq t < ETS(m)+D0+\tau$

Rout=RZ: $ETS(m)+D0+\tau \leq t$

It may be considered that D0=0 for simplification. Thus, since the bit stream input to the decoder buffer 27 may be considered from t=0, handling of time is facilitated.

In the encoder system of FIG. 7, the picture A(i) for i<k corresponds to S82. The rate controller 75 indicates the value satisfying the condition of the equation (2-4) (i.e., the value of the picture A(k)) as the amount of allocated bits S81 of the k-th picture A(k). By conducting such control, encoding may be performed without causing overflow or underflow of the decoder buffer.

Comparison between the VBV buffer model and a real encoder system will now be described.

Figure 9:
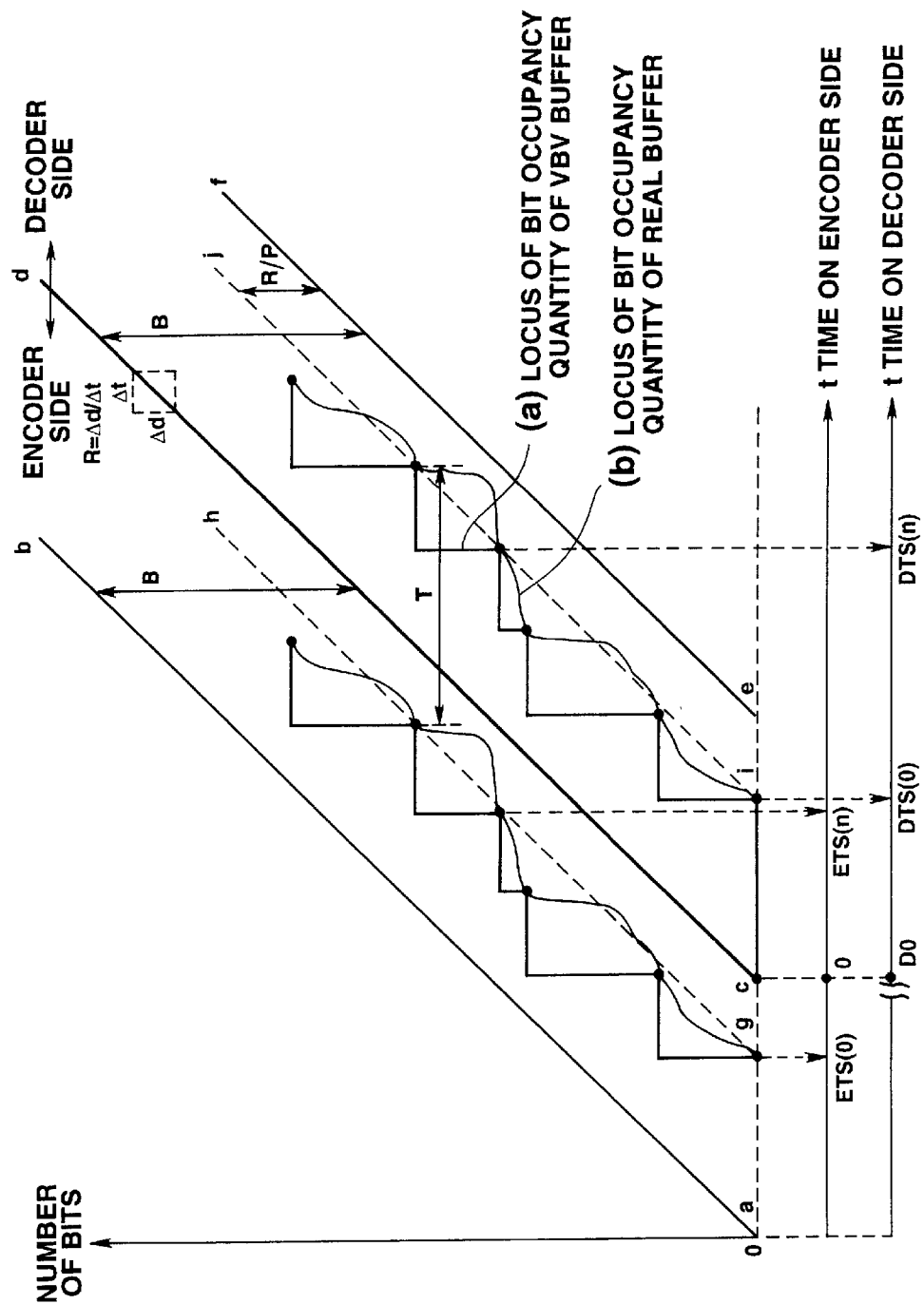
FIG. 9 illustrates the difference in locus of the bit occupancy quantity of the buffer between a VBV buffer model and a real encoder system.

FIG. 9 shows the difference in locus of the bit occupancy quantity between the buffer of the VBV buffer model and the buffer of the real encoding system.

In the above-described first embodiment, since description is made on the assumption of the VBV buffer model, an ideal locus of the bit occupancy quantity as indicated by (a) in FIG. 9 is obtained. On the other hand, in the real encoder system and decoder system, the locus of the bit occupancy quantity of each buffer is generally a locus as indicated by (b) in FIG. 9. That is, since encoding or decoding of each picture takes a time equal to a display interval of the picture (e.g., 1/29.97 seconds or 1/25 seconds), the curved locus as indicated by (b) in FIG. 9 is obtained. Such curved locus is affected by the biased amount of encoded bits in the picture.

In both the VBV model and the real encoder and decoder systems, the time interval T from the time point ETS(i) at which the picture A(i) is encoded to the time point DTS(i) at which the picture A(i) is decoded is constant for all "i" s.

The different in this case is that the locus of the bit occupancy quantity of the real decoder buffer has the amount of bits greater than the locus of the bit occupancy quantity of the VBV model, by Δd at the maximum. Δd is expressed as follows.

$$\Delta d = \text{Rout}/P$$

where Rout represents the input bit rate to the decoder buffer and P represents the display interval of the picture.

Therefore, in the real encoder system, overflow of the decoder buffer may be avoided by setting the usable buffer size to be smaller than the VBV buffer size by Δd.

To realize this, on the side of the encoder system, the rate controller 75 must be controlled so that the locus of the bit occupancy quantity of the VBV buffer of the decoder system is located between a line c-d and a line i-j in FIG. 9.

In this case, even when the locus of the bit occupancy quantity of the real decoder buffer traces the locus of the bit occupancy quantity greater than that of the VBV buffer by Δd, it is ensured that overflow of the decoder buffer will not occur.

By taking this into consideration in the encoder system of the first embodiment, more stable picture reproduction on the side of the decoder system may be ensured.

Specifically, the equation (2-4) may be altered as follows.

$$Od(k)+\text{Rout}\times(dts(k+1)-DTS(k))-B+\Delta d \leq A(k) \leq Od(k) \quad (3\text{-}1)$$

As the amount of allocated bits S71 of the k-th picture, a value satisfying the condition of the equation (3-1) (i.e., the size of the picture A(k)) is indicated. By conducting such control, encoding may be performed without causing overflow or underflow of the decoder buffer.

In this encoder system of the first embodiment, even when the encoding bit rate is changed, the buffer of the same size as the VBV buffer size of the decoder system may be constantly used without limiting the buffer size usable for the encoder system. Therefore, high picture quality is obtained. Thus, in the case where the delay amount between the encoder system and the decoder system is not considered much, the encoder system of the first embodiment may be used satisfactorily.

Next, a second embodiment of the present invention will be described with reference to the drawings.

The minimum bit rate RMIN set in the encoder system of the first embodiment shown in FIG. 7 is the minimum bit rate such that the code buffer size used by the encoder system for rate control is made equal to the size of the decoder buffer (VBV buffer).

In the second embodiment, an encoded signal transmission method is described which is improved from the first embodiment and has an encoding bit rate smaller than RMIN in encoding at a variable bit rate.

Figure 10:
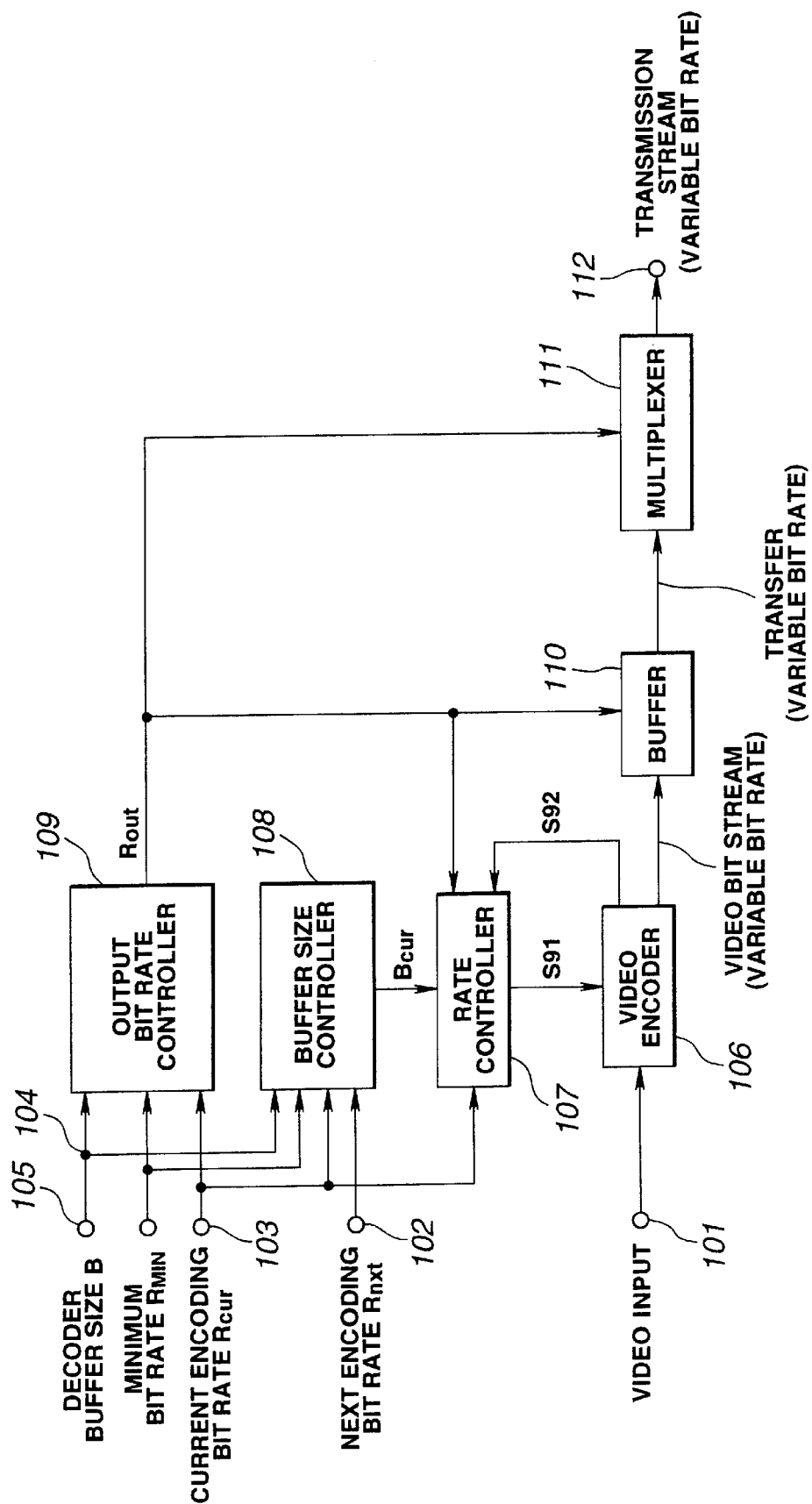
FIG. 10 is a block circuit diagram showing an encoder system of a second embodiment according to the present invention.

FIG. 10 shows an exemplary structure of an encoder system to which the second embodiment of the encoded signal transmission method according to the present invention is applied.

In the encoder system of FIG. 10, an input video sequence is encoded at a variable bit rate and then outputted at a variable bit rate from an encoder buffer 110. In order to control the encoder buffer 110, this encoder system of FIG. 10 differs from the encoder system of FIG. 1 as described as the conventional technique, with respect to the function of an output bit rate controller 109 and a buffer size controller 108, and the size required for the encoder buffer 110.

In the encoder system of FIG. 1 as described as the conventional technique, the bit rate R indicated from the terminal 16 directly becomes the output bit rate R from the encoder buffer 13. Also, in FIG. 1, it suffices to have the size B of the encoder buffer 13 equal to the size of the decoder buffer 27.

On the contrary, in the encoder system of FIG. 10, the output bit rate controller 109 controls an output bit rate Rout from the encoder buffer 110. In addition, in the encoder system of FIG. 10, a code buffer size Bcur which may be used by the encoder system for rate control is controlled by the buffer size controller 108. Also, the size of the encoder buffer 110 must be greater than the size of the decoder buffer (VBV buffer).

In the encoder system of FIG. 10, a video signal is inputted from a terminal 101, and a target value Rcur of the encoding bit rate for the current input video signal may be freely designated by a user from a terminal 103. The unit for altering the current encoding bit rate Rcur is, for example, a group of pictures (GOP) of 15 frames.

A video encoder 106 encodes the current input picture so as to be close to the amount of allocated bits S91 designated from a rate controller 107, and supplies the bit stream of the resulting encoded picture to the encoder buffer 110. At the same time, the video encoder 106 supplies the amount of generated bits S92 of the encoded picture to the rate controller 107.

The initial bit occupancy quantity b0 of the decoder buffer at the start of decoding, the amount of generated bits S92 of the encoded picture, the current encoding bit rate Rcur, and the buffer size Bcur indicated by the buffer size controller 108 are inputted to the rate controller 107. The rate controller 107 then calculates the amount of allocated bits S91 of a picture to be encoded next by a method as later described, and designates the amount of allocated bits S91 to the video encoder 106.

The bit stream outputted from the encoder buffer 110 at the output bit rate Rout is inputted to a multiplexer 111. Although not shown, an encoded bit stream of audio signals is also inputted to the multiplexer 111. The multiplexer 111 performs system encoding and multiplexing of a plurality of input bit streams, and outputs multiplexed bit streams from a terminal 112.

The output bit rate controller 109, the buffer size controller 108, the rate controller 107, and the encoder buffer 110 are hereinafter described with reference to FIG. 11.

Figure 11:
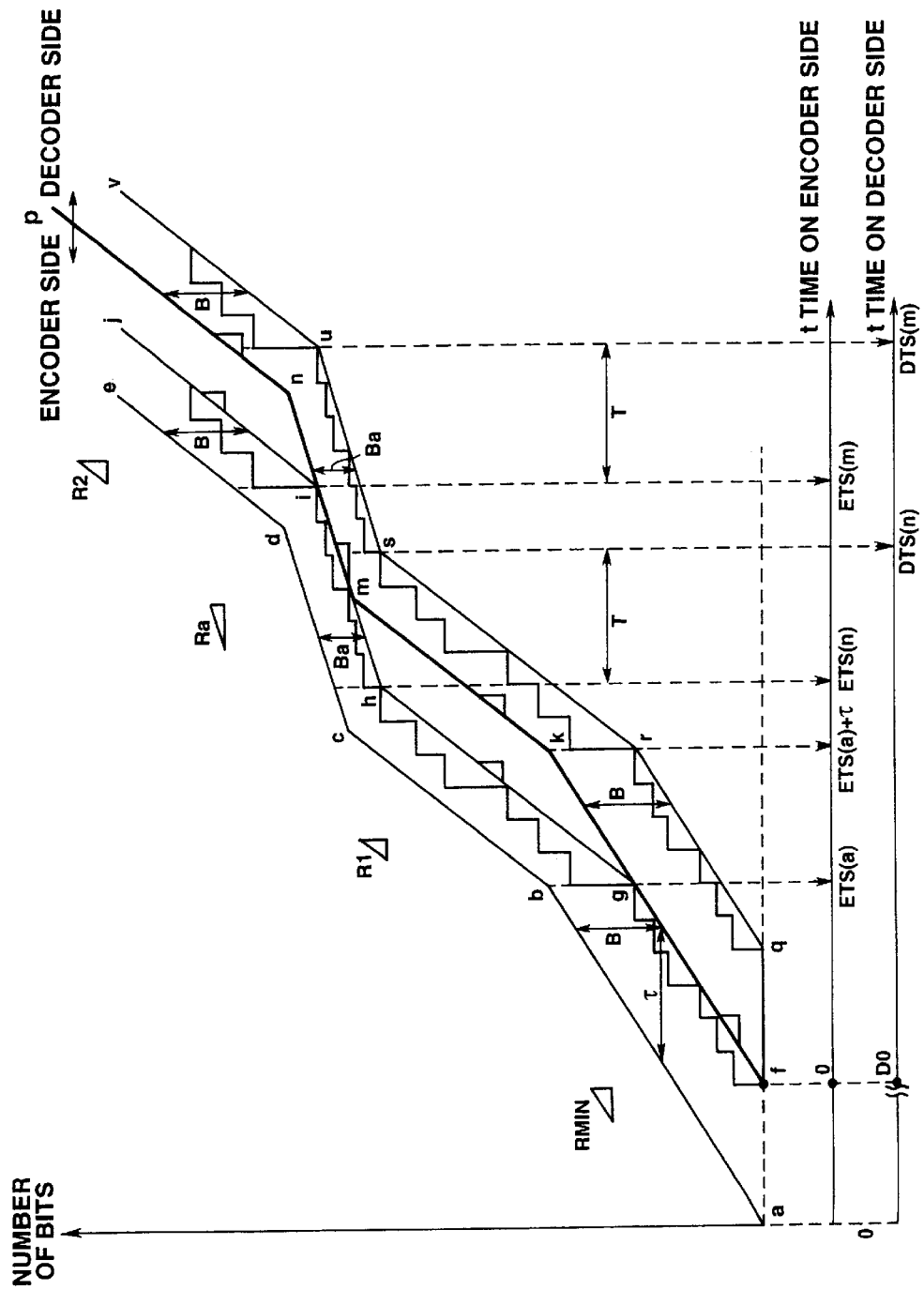
FIG. 11 illustrates changes in the bit occupancy quantity of buffers of the encoder system and the decoder system of the second embodiment.

FIG. 11 shows changes in the bit occupancy quantity of the buffers of the encoder system and the decoder system in the present embodiment. The decoder system in this case is the same as the decoder system of FIG. 2 described as the conventional technique. In FIG. 11 the same symbols as those in FIG. 8 have the same meanings, such as, D0, A(n), ETS(n), DTS(n), T(n) and the like.

The area on the left side of a bent line f-k-m-n-p expresses changes in the bit occupancy quantity of the encoder buffer 110 of the encoder system, and the area on the right side of the line expresses changes in the bit occupancy quantity of the decoder buffer 27 of the decoder system.

The slope of the line f-k-m-n-p at a time point t expresses the output bit rate Rout from the encoder buffer 110 at the time point t, when viewed from the side of the encoder system, and expresses a change in the input bit rate to the decoder buffer 27 at the time point t, when viewed from the side of the decoder system.

The slope of a bent line f-g-h-i-j at a time point t expresses an encoding bit rate Rcur(t) at the time point t. The width in the direction vertical axis between the bent line f-g-h-i-j and a bent line a-b-c-d-e expresses the code buffer size which may be used by the encoder system for rate control at the time point t. The width in the direction of vertical axis between the bent line f-k-m-n-p and a bent line q-r-s-u-v at the time point t expresses the VBV buffer size required for the decoder at the time point t. The buffer size which may be used by the encoder system at t=ETS(i) and the buffer size required for the decoder system at t=DTS(i) are equal to each other.

In this embodiment, the encoding bit rate Rcur(t) at the time point t is designated as follows.

$0 \leq t < \text{ETS}(a)$ Rcur(t)=RMIN
$\text{ETS}(a) \leq t < \text{ETS}(n)$: Rcur(t)=R1 (R1$\geq$RMIN)
$\text{ETS}(n) \leq t < \text{ETS}(m)$: Rcur(t)=Ra (Ra<RMIN)
$\text{ETS}(m) \leq t$: Rcur(t)=R2 (R2$\geq$RMIN)

The embodiment of FIG. 11 differs from the above-described first embodiment of FIG. 8 in that, in FIG. 11, the encoding bit rate Rcur(t) for ETS(n)$\leq$t<ETS(m) is designated as a value smaller than the minimum bit rate RMIN of the first embodiment.

A method of controlling the output bit rate Rout from the encoder buffer 110 by the output bit rate controller 109 in this case will now be described.

The encoding bit rate Rcur for sections of $0 \leq t < \text{ETS}(n)$ and $t \geq \text{ETS}(m)$ is at a value equal to or greater than the minimum bit rate RMIN. The output bit rate Rout from the encoder buffer 110 indicated by the output bit rate controller 109 with respect to the encoding bit rate Rcur of these sections is as explained in the first embodiment with reference to FIGS. 7 and 8. That is, the minimum delay time from when the current encoding bit rate Rcur is changed to when the output bit rate Rout of the encoder buffer 110 is changed is τ calculated by the following equation (a-1).

$$\tau = B/\text{RMIN} \quad (a\text{-}1)$$

where B represents the size of the decoder buffer (VBV buffer).

For example, at t=ETS(a)+τ (i.e., the time point of k) after the delay time τ from when the encoding bit rate Rcur is changed from the minimum bit rate RMIN to R1 at t=ETS(a), the output bit rate Rout is changed from the minimum bit rate RMIN to R1.

Also, the minimum delay time of the time interval (delay time) T from the time point ETS(i) at which an i-th picture A(i) is encoded (where i=a, n, m, etc.) to the time point DTS(i) at which the i-th picture is decoded is calculated by the following equation (a-2).

$$T = \tau + D0 \quad (a\text{-}2)$$

where D0 represents a channel delay (constant transmission line delay time).

Figure 12:
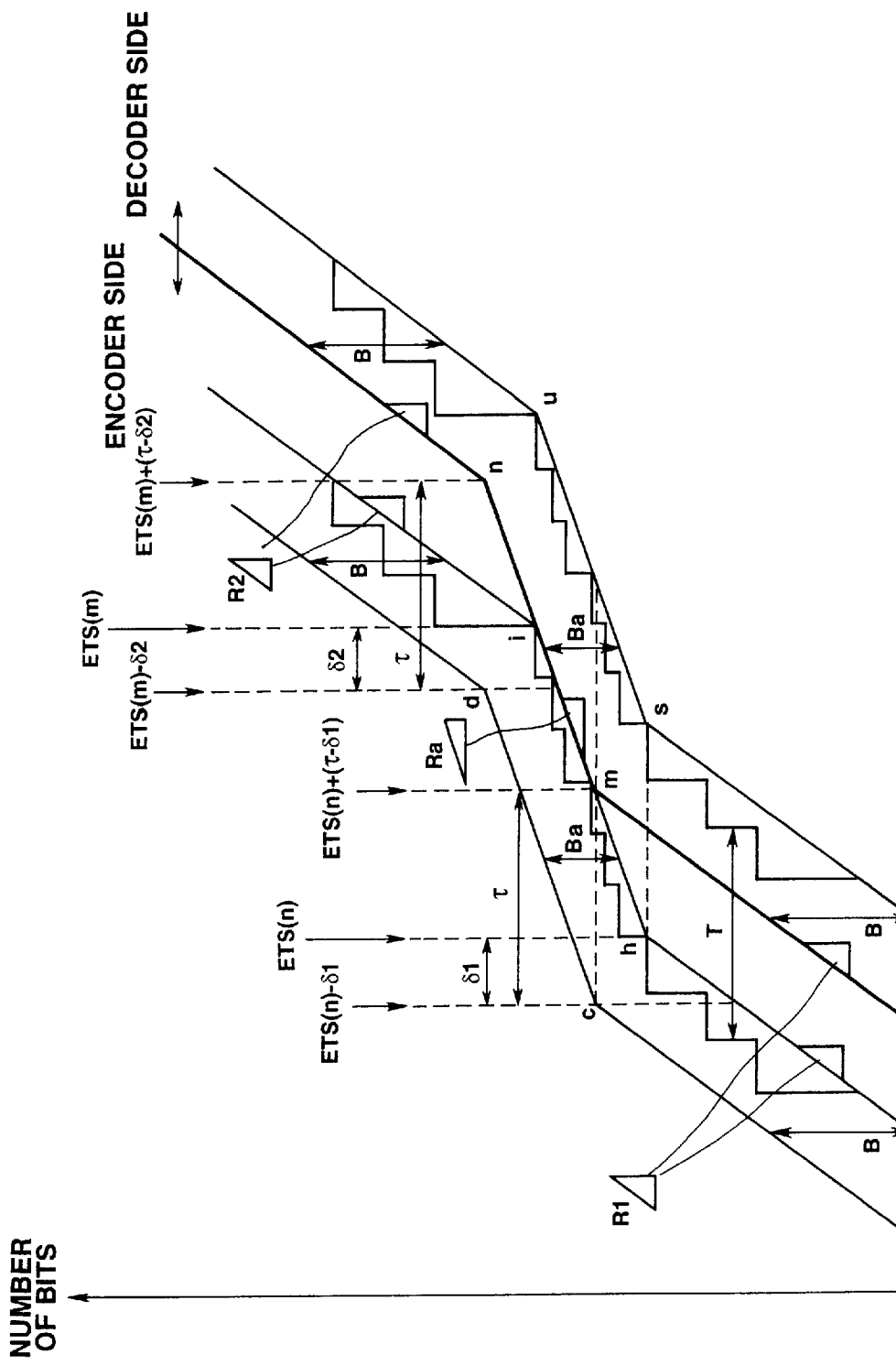
FIG. 12 is an enlarged view of FIG. 11.

Next, the encoding bit rate Rcur(t) for the section of ETS(n)≤t<ETS(m) is a value Ra smaller than the minimum bit rate RMIN. FIG. 12 shows an enlarged view of this section. In this case, after the encoding bit rate Rcur is changed from R1 to Ra at t=ETS(n) (i.e., the time point of h), the output bit rate Rout is changed from R1 to Ra at t=ETS(n)+(τ−δ1) (i.e., the time point of m) after a delay time of (τ−δ1). Also, after the encoding bit rate Rcur is changed from Ra to R2 at t=ETS(m) (i.e., the time point of i), the output bit rate Rout is changed from Ra to R2 at t=ETS(n)+(τ−δ2) (i.e., the time point of n) after a delay time of δ1, 21 are calculated by the following equations (a-3) and (a-4), respectively.

$$\delta 1 = (B - Ba)/(R1 - Ra) \quad (a\text{-}3)$$

$$\delta 2 = (B - Ba)/(R2 - Ra) \quad (a\text{-}4)$$

Thus, with respect to the example of FIG. 11, the output bit rate Rout from the encoder buffer 110 indicated by the output bit rate controller 109 has the following relations.

$$0 \leq t < ETS(a) + \tau: \text{Rout} = \text{RMIN} \quad (d\text{-}1)$$

$$ETS(a) + \tau \leq t < ETS(n) + (\tau - \delta 1): \text{Rout} = R1 \quad (d\text{-}2)$$

$$ETS(n) + (\tau - \delta 1) \leq t < ETS(m) + (\tau - \delta 2): \text{Rout} = Ra \quad (d\text{-}3)$$

$$ETS(m) + (\tau - \delta 2) \leq t: \text{Rout} = R2 \quad (d\text{-}4)$$

Next, a method of controlling the code buffer size Bcur usable for the encoder system at the time point t by the buffer size controller 108 will now be described.

As the code buffer size Bcur for sections of t≤ETS(n)−δ1 and t≥ETS(m), the size B equal to the size of the decoder buffer (VBV buffer) may be used. That is, $$t \leq ETS(n) - \delta 1, \; t \geq ETS(m): \text{Bcur}(t) = B.$$

On the other hand, the code buffer size Bcur which may be used by the encoder system for ETS(n)≤t≤ETS(m)+δ2 is equal to or smaller than the size calculated by the following equation (a-5).

$$ETS(n) \leq t \leq ETS(m) + \delta 2: \text{Bcur}(t) = Ba = Ra^*B/\text{RMIN} = Ra^*\tau \quad (a\text{-}5)$$

For ETS(n)−δ1≤t≤ETS(n), the code buffer size Bcur is changed from B to Ba with the lapse of time, as calculated by the following equation (a-6).

$$ETS(n) - \delta 1 \leq t \leq ETS(n): \; a = t - (ETS(n) - \delta 1) \; \text{Bcur}(t) = B^*(\delta 1 - a)/\delta 1 + Ba^*a/\delta 1 \quad (a\text{-}6)$$

Similarly, for ETS(m)−δ2≤t≤ETS(m), the code buffer size Bcur is changed from Ba to B with the lapse of time, as calculated by the following equation (a-7).

$$ETS(m) - \delta 2 \leq t \leq ETS(m): \; a = t - (ETS(m) - \delta 2) \; \text{Bcur}(t) = B^*(\delta 2 - a)/\delta 2 + Ba^*a/\delta 2 \quad (a\text{-}7)$$

In this manner, the buffer size controller 108 designates the code buffer size Bcur which may be used by the encoder system at the time point t.

Meanwhile, the output bit rate Rout and the code buffer size Bcur in the case where the encoding bit rate Rcur is continuously changed within a range of values smaller than the minimum bit rate RMIN will now be described with reference to FIG. 13.

Figure 13:
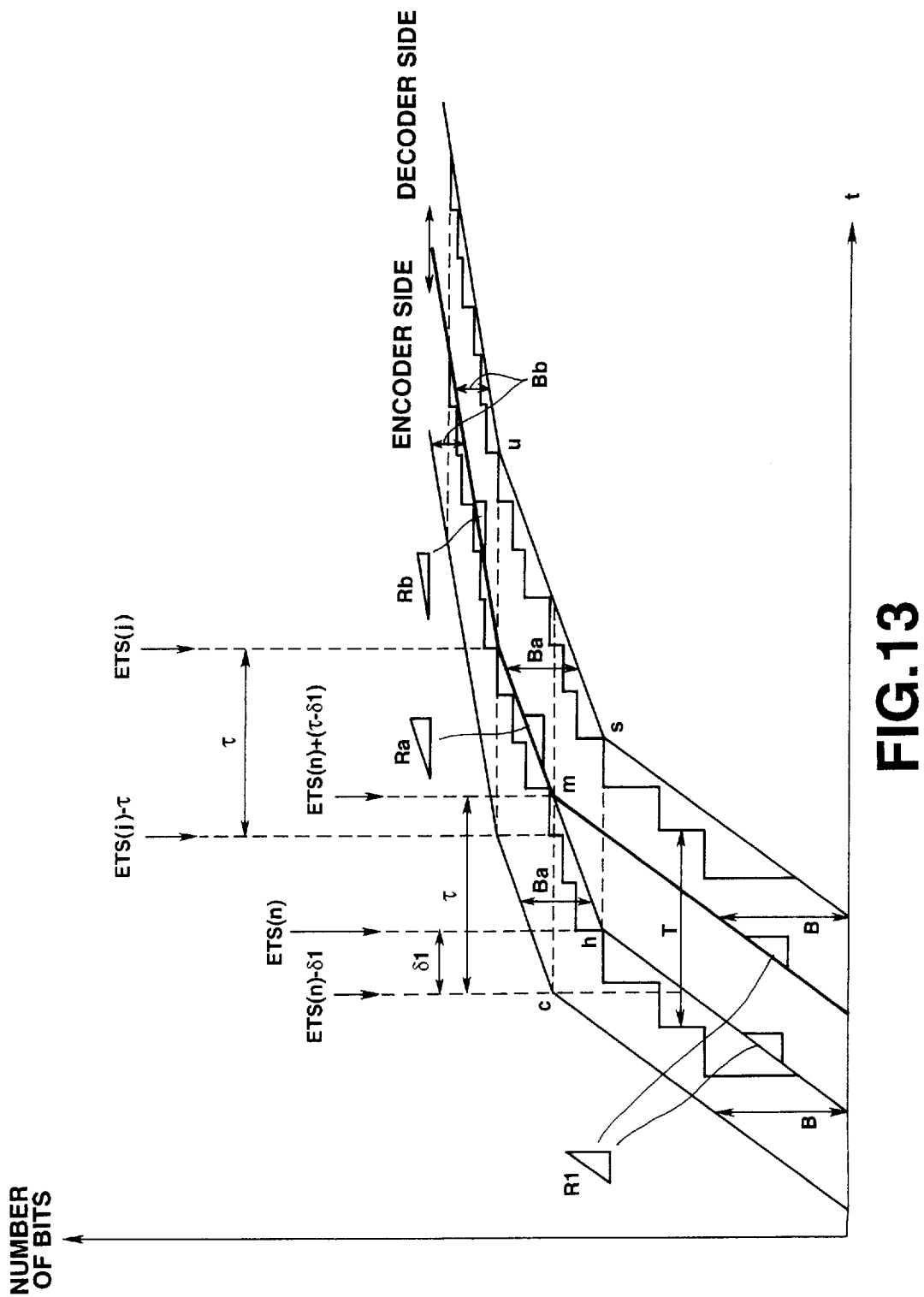
FIG. 13 illustrates another example of changes in the bit occupancy quantity of the buffers of the encoder system and the decoder system of the second embodiment.

In FIG. 13, the encoding bit rate Rcur for t≥ETS(m) in FIG. 11 (or FIG. 12) is replaced by the encoding bit rate Rcur for t≥ETS(j). In FIG. 13, the encoding bit rate Rcur is changed to Rb (<RMIN) from t=ETS(j). In this case, the encoding bit rate Rcur is continuously changed from Ra to Rb within a range of values smaller than the minimum bit rate RMIN. That is, ETS(n)≤t<ETS(j): Rcur=Ra (Ra<RMIN)

ETS(j)≤t: Rcur=Rb (Rb<RMIN).

A method of controlling the output bit rate Rout and the code buffer size Bcur in this case is hereinafter explained.

First, the output bit rate Rout is changed in synchronization with the encoding bit rate Rcur, for t≥ETS(n)+(τ−δ1). That is, $$ETS(n) + (\tau - \delta 1) \leq t < ETS(j): \text{Rout} = Ra \quad (d\text{-}5)$$

$$ETS(j) \leq t: \text{Rout} = Rb \quad (d\text{-}6)$$

Then, the code buffer size Bcur is now explained. The code buffer size Bcur becomes a value Bb calculated by the following equation (a-8), for t≥ETS(j).

$$t > ETS(j): \text{Bcur}(t) = Bb = Rb^*B/\text{RMIN} = Rb^*\tau \quad (a\text{-}8)$$

The code buffer size Bcur for ETS(j)−τ≤t<ETS(j) is changed from Ba to Bb with the lapse of time, as calculated by the following equation (a-9).

$$ETS(j) - \tau \leq t < ETS(j): \; a = t - (ETS(j) - \tau) \; \text{Bcur}(t) = Ba^*(\tau - a)/\tau + Ba^*a \quad (a\text{-}9)$$

When the encoding bit rate Rcur is changed to a value equal to or greater than the minimum bit rate RMIN next to Rb, the output bit rate Rout and the code buffer size Bcur are changed as explained in the case of t≥ETS(m)−τ2 of FIG. 12. When the encoding bit rate Rcur is changed from Rb to the minimum bit rate RMIN, the relation of δ2=τ is obtained.

Thus, in the case where the encoding bit rate Rcur is continuously changed within a range of values smaller than the minimum bit rate RMIN, the output bit rate controller 109 controls the output bit rate Rout, and the buffer size controller 108 controls the code buffer size Bcur.

The encoder system must perform encoding carefully enough to prevent overflow or underflow of the decoder buffer, on the assumption of the model as described above. Specifically, the rate controller 107 must be controlled so that the step-like locus on the side of the decoder system of FIG. 11 is located between the bent line f-k-m-n-p and the bent line q-r-s-u-v. To meet this condition, it suffices to control the rate controller 107 so that the step-like locus on the side of the encoder system is located between the bent line a-b-c-d-e and the bent line f-g-h-i-j.

In the above-described first embodiment, the method of performing rate control is described on the assumption of the state of the bit occupancy quantity of the buffer of the decoder system. In the present embodiment, however, the method of performing rate control will be described on the assumption of the state of the bit occupancy quantity of the encoder buffer of the encoder system.

When the k-th picture A(k) is to be encoded, the encoder system encodes the picture on the assumption of the state of the bit occupancy quantity of the encoder buffer at the time of encoding. At this point, the amount of generated bits of the k-th picture A(k) (i.e., the size of the picture A(k)) must satisfy the following conditions.

When k=0, $$AA(0) \leq b0$$

When k>1, $$Oe(k) = \sum_{i=0}^{k-1} A(i) - \sum_{i=0}^{k=1} ((ETS(i+1) - ETS(i)) \times Rcur(i))$$

$$Rcur(k) \times (ETS(k+1) - ETS(k)) - Oe(k) \leq AA(k) \leq Bcur(k) - Oe(k) \quad \text{(b-2)}$$

where $AA(k) \geq 0$, $A(k) \leq AA(k)$

In this case, b0 represents the initial bit occupancy quantity of the decoder buffer at the start of decoding.

Oe(i) represents the bit occupancy quantity of the encoder buffer immediately before the i-th picture A(i) is encoded.

ETS(i) represents the time point for encoding the i-th picture A(i).

A(i) represents the amount of encoded bits of the i-th picture A(i).

AA(i) represents the amount of allocated bits of the i-th picture A(i).

Bcur(i) represents the code buffer size Bcur (indicated by the buffer size controller 108) which may be used by the encoder system at the time point for encoding the i-th picture A(i).

Rcur(i) represents the encoding bit rate Rcur at an interval between the i-th picture A(i) and the (i+1)th picture A(i+1).

Bcur(i) and Rcur(i) are indicated as explained in the above-described embodiment.

In the case where the problem of underflow of the encoder buffer is not taken into consideration, the following equation (b-4) may be used in place of the equation (b-2).

$$AA(k) \leq Bcur(k) - Oe(k) \quad \text{(b-4)}$$

where $AA(k) \geq 0$, $0 \leq Oe(k) \leq B$

When the equation (b-4) is employed, if the output bit rate from the encoder buffer 110 of FIG. 10 does not reach Rout, the multiplexer 111 performs bit stuffing to increase the output bit rate to Rout.

The rate controller 107 designates the value AA(i) satisfying the condition of the equation (b-2) to the video encoder 106, as the amount of allocated bits S91 of the i-th picture A(i). As the amount of bits S92 actually generated at the video encoder 106, the amount of encoded bits of the i-th picture A(i) (i.e., the size of the picture A(i)) is supplied to the rate controller. By conducting such control, encoding may be performed without causing overflow or underflow of the decoder buffer.

The buffer size BBMAX required for the encoder buffer 110 is calculated by the following equation (b-3) in a manner similar to the first embodiment.

$$B B\ MAX = RMAX \times B/RMIN = RMAX \times \tau \quad \text{(b-3)}$$

In this equation, B represents the VBV buffer size of the decoder system.

RMIN represents the minimum bit rate of the encoding bit rate Rcur(t) such that the code buffer size usable for the encoder system may be made equal to the decoder buffer size B.

RMAX represents the maximum value of the encoding bit rate Rcur(t).

In addition, as the time interval T of the equation (a-2) is explained as the minimum delay time, the delay time may be increased by $\Delta\tau$ as indicated by the following equation (c-1).

$$T = (\tau + \Delta\tau) + D0 \quad \text{(c-1)}$$

$\Delta\tau$ is a value not smaller than 0 and independent of $\tau$. This may be shown in the drawing such that the bit occupancy quantity located between the bent line f-k-m-n-p and the bent line q-r-s-u-v in FIG. 11 is translated to the future (i.e., to the right) by $\Delta\tau$.

When $\Delta\tau$ is greater than 0, the buffer size BBMAX required for the encoder buffer 110 must be the size of $\Delta B$ calculated by the following equation (c-2) in addition to the value calculated by the equation (b-3).

$$\Delta B = RMAX \times \Delta\tau \quad \text{(c-2)}$$

Also, when $\Delta\tau$ is greater than 0, the timing of the output bit rate Rout from the encoder buffer 110 indicated by the above-mentioned equations (d-1) to (d-4) is delayed to the future by $\Delta\tau$. That is, equations (d-1) to (d-4) are altered to the following equations (e-1) to (e-4), respectively.

$$\Delta\tau \leq t < ETS(a) + \tau + \Delta\tau: \text{Rout} = RMIN \quad \text{(e-1)}$$

$$ETS(a) + \tau + \Delta\tau \leq t < ETS(n) + (\tau - \delta 1) + \Delta\tau: \text{Rout} = R1 \quad \text{(e-2)}$$

$$ETS(n) + (\tau - \delta 1) + \Delta\tau \leq t < ETS(m) + (\tau - \delta 2) + \Delta\tau: \text{Rout} = Ra \quad \text{(e-3)}$$

$$ETS(m) + (\tau - \delta 2) + \Delta\tau \leq t: \text{Rout} = R2 \quad \text{(e-4)}$$

In addition, the equations (d-5) and (d-6) are altered to the following equations (e-5) and (e-6), respectively.

$$ETS(n) + (\tau - \delta 1) + \Delta\tau \leq t < ETS(j) + \Delta\tau: \text{Rout} = Ra \quad \text{(e-5)}$$

$$ETS(j) + \Delta\tau \leq t: \text{Rout} = Rb \quad \text{(e-6)}$$

As described above, in the second embodiment of the present invention, the minimum value RMIN of the encoding bit rate Rcur at the time when the code buffer size Bcur used by the encoder system for rate control is made equal to the decoder buffer (VBV buffer) size B is set. When Rcur is equal to or greater than RMIN, the relation of Bcur=B is obtained. When Rcur is smaller than RMIN, the relation of Bcur<B is obtained. Thus, the effect similar to that of the first embodiment may be realized.

It is to be noted that the present invention is not limited to the above-described embodiments, and that digital signals to be handled in this invention include audio signals as well as video signals. Various other changes and modifications may be effected without departing from the scope of the present invention.

According to the encoded signal transmission method and apparatus of the present invention, by controlling the size of th transmission buffer for temporarily storing an encoded signal on the encoder side in response to the encoding bit rate, overflow or underflow of the buffer of the decoder system may be prevented in the case when a digital signal from the encoder (transmission) side is encoded at a variable bit rate and transmitted to the decoder system (receiving) side at a variable bit rate on the real-time basis. Thus, stable signal reproduction is enabled.

In the first specific example of such control of the transmission buffer size, on the assumption that the size of the code buffer usable for the encoder is constant, the output bit rate from the transmission buffer is altered to a new encoding bit rate value after a predetermined delay time from when the encoding bit rate is altered. In this case, the delay time is determined from the receiving buffer size of the decoder system and the minimum value of the encoding bit rate. The transmission buffer size required for the encoder is determined from the receiving buffer size of the decoder system and the minimum value and maximum value of the encoding bit rate.

In the second specific example, it is assumed that the minimum value of the encoding bit rate at the time when the code buffer size used by the encoder for rate control is made equal to the size required for the receiving buffer is RMIN and the maximum value thereof is RMAX. When the encoding bit rate is equal to or greater than the minimum value RMIN, the code buffer size is set at a predetermined constant value. When the encoding bit rate is smaller than the minimum value RMIN, the coder buffer size is altered to be smaller than the constant value.

By these specific examples, stable signal reproduction corresponding to the variable bit rate may be realized. In addition, according to these specific examples, even when the encoding bit rate is changed, the buffer of the same size as the VBV buffer size of the decoder system may be constantly used without limiting the buffer size usable for the encoder. Therefore, the picture quality is improved. Thus, it is preferred to employ such specific examples in the case where the delay amount between the encoder system and the decoder system is not much considered.

What is claimed is:

1. An encoded signal transmission apparatus for encoding and transmitting a digital data signal at a variable bit rate, the apparatus comprising:

an encoder for receiving and encoding a digital data signal at a variable encoding rate to generate an encoded signal;

a transmission buffer for storing said encoded signal;

a rate controller for varying the transmission rate of said encoded signal from said transmission buffer after a delay period in response to changes in said encoding rate; and a buffer size controller for dynamically varying the size of said transmission buffer in accordance with changes in said encoding rate.

2. A method of encoding and transmitting a digital data signal comprising the steps of:

receiving a digital data signal;

encoding said digital data signal at a variable encoding rate to generate an encoded signal;

storing said encoded signal in a transmission buffer;

transmitting said encoded signal from said transmission buffer to a receiving buffer at a variable transmission rate, wherein said transmission rate is varied after a delay period in response to changes in said encoding rate; and dynamically varying the size of said transmission buffer in accordance with changes in said encoding rate.

3. A method of encoding and transmitting a digital data signal comprising the steps of:

receiving a digital data signal;

communicating said digital data signal to an encoder;

encoding said digital data signal at a variable encoding rate to generate an encoded signal;

communicating said encoded signal to a transmission buffer which dynamically varies in size;

storing said encoded signal in said transmission buffer;

and transmitting said encoded signal from said transmission buffer to a receiving buffer at a variable transmission rate, wherein the transmission rate is varied after a delay period, $\tau$, in response to changes in said encoding rate and further wherein $\tau$ is such that $\tau=B/RMIN$; where the size of said receiving buffer is given by B, and the minimum value of said encoding rate is given by RMIN.

4. A method as recited in claim 3 further wherein the size of said transmission buffer, BBMAX, is such that BBMAX=B(RMAX/RMIN); where the size of said receiving buffer is given by B, the minimum value of said encoding rate is given by RMIN, and the maximum value of said encoding rate is given by RMAX.

5. A method as recited in claim 2 wherein the size, Bcur, of said transmission buffer is adjusted in accordance with changes in said encoding rate, Rcur, such that Bcur is set equal to Rcur(B/RMIN) in accordance with Rcur falling below a threshold value RMIN; where the size of said receiving buffer is given by B.

6. A method as recited in claim 2 or claim 5 wherein, when said encoding rate is varied so as to either rise above or fall below a threshold value RMIN at a time t, the size of said transmission buffer is adjusted in value at an earlier time $t-\delta$, and further wherein said transmission rate is adjusted in value after at least a delay period time of $(\tau-\delta)$ from the time t; where $\delta$ is given by $\delta=(B-Bcur)/(Rprev-Rcur)$, $\tau$ is given by $\tau=B/RMIN$, Rcur is the value of the encoding rate at time t, Rprev is the value of the encoding rate prior to either rising above or falling below the threshold value RMIN, the size of said receiving buffer is given by B, and Bcur is given by Bcur=Rcur(B/RMIN).

* * * * *

UNITED STATES PATENT AND TRADEMARK OFFICE
CERTIFICATE OF CORRECTION

PATENT NO.    : 6,188,700 B1
DATED         : February 13, 2001
INVENTOR(S)   : Motoki Kato et al.

It is certified that error appears in the above-identified patent and that said Letters Patent is hereby corrected as shown below:

<u>Title page,</u>
Item [57], ABSTRACT,
Line 1, delete first "signal".

<u>Column 5,</u>
Line 66, delete "r" and insert -- $\tau$ --.

<u>Column 6,</u>
Line 35, after the equation, delete "(3)" and insert -- (2) -- to edge of column on right side.

<u>Column 7,</u>
Line 19, delete "RI" change to -- R1 --.

<u>Column 9,</u>
Line 34, delete "nth" insert -- n-th --.

<u>Column 12,</u>
Line 57, add -- $\tau$1. -- to the end of the sentence.

<u>Column 13,</u>
Line 52, after the equation, add -- (2-3) -- to edge of column on right side.

<u>Column 14,</u>
Line 44, change "different" to -- difference --.

<u>Column 16,</u>
Line 52, insert -- : -- between "(a)" and "Rcur"

<u>Column 17,</u>
Line 36, add -- $\tau$-$\delta$2. -- to the end of the sentence.

<u>Column 18,</u>
Line 49, move "Bcur(t) . . . (a-a)" to next line;
Line 54, change "$\tau$", to -- $\delta$ --.

UNITED STATES PATENT AND TRADEMARK OFFICE
CERTIFICATE OF CORRECTION

PATENT NO. : 6,188,700 B1
DATED : February 13, 2001
INVENTOR(S) : Motoki Kato et al.

It is certified that error appears in the above-identified patent and that said Letters Patent is hereby corrected as shown below:

<u>Column 19,</u>
Line 22, change "k>1", to -- $k \geq 1$ --.
Line 25, after the equation, add -- (b-1) -- to the edge of column on right side.

<u>Column 20,</u>
Line 7, change "B B MAX" to -- BBMAX --.

<u>Column 21,</u>
Line 1, change "th" to -- the --.

Signed and Sealed this

Eighteenth Day of June, 2002

*Attest:*

JAMES E. ROGAN
*Attesting Officer*     *Director of the United States Patent and Trademark Office*